United States Patent
Li et al.

(10) Patent No.: US 12,185,226 B2
(45) Date of Patent: Dec. 31, 2024

(54) EARLY INDICATION OF NEW RADIO-LIGHT DEDICATED SYSTEM INFORMATION

(71) Applicant: Qualcomm Incorporated, San Diego, CA (US)

(72) Inventors: Qiaoyu Li, Beijing (CN); Jing Lei, San Diego, CA (US); Chao Wei, Beijing (CN); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/773,902

(22) PCT Filed: Nov. 26, 2020

(86) PCT No.: PCT/CN2020/131672
§ 371 (c)(1),
(2) Date: May 3, 2022

(87) PCT Pub. No.: WO2021/109915
PCT Pub. Date: Jun. 10, 2021

(65) Prior Publication Data
US 2022/0408348 A1    Dec. 22, 2022

(30) Foreign Application Priority Data
Dec. 4, 2019  (WO) ................ PCT/CN2019/122892

(51) Int. Cl.
*H04W 72/04*   (2023.01)
*H04L 5/00*    (2006.01)
(Continued)

(52) U.S. Cl.
CPC ............. *H04W 48/12* (2013.01); *H04L 5/001* (2013.01); *H04L 5/0048* (2013.01);
(Continued)

(58) Field of Classification Search
CPC . H04W 48/12; H04W 48/16; H04W 52/0229; H04W 56/0015; H04L 5/001; H04L 5/0048; H04L 5/0094; H04L 5/0053
See application file for complete search history.

(56) References Cited

U.S. PATENT DOCUMENTS

2015/0271729 A1   9/2015  Sirotkin et al.
2019/0223084 A1   7/2019  John Wilson et al.
(Continued)

FOREIGN PATENT DOCUMENTS

CN    106550417 A    3/2017
CN    109699067 A    4/2019
(Continued)

OTHER PUBLICATIONS

Dahlman E., et al., "5G NR The Next Generation Wireless Access Technology", Aug. 17, 2018, 400 Pages, XP055775576, p. 197-p. 210, Chapter 16, figure 16.1.
(Continued)

*Primary Examiner* — Mahbubul Bar Chowdhury
(74) *Attorney, Agent, or Firm* — Holland & Hart LLP

(57) ABSTRACT

Methods, systems, and devices for wireless communications are described. The described techniques relate to an early indication, from a base station to a user equipment (UE), that may allow the UE to determine from the first symbol of a synchronization signal block (SSB) if the system information associated with the SSB is intended for the UE. Thus, when the UE receives the indication that the system information is dedicated to the UE, the UE may determine to receive and decode the remaining synchronization signal block, a master information block, a set of control resources, a downlink control channel, and a downlink shared channel to receive the system information. In some cases, the UE may determine that the system information is generic and
(Continued)

end decoding during reception of the SSB to conserve computational resources by avoiding unnecessary decoding.

30 Claims, 22 Drawing Sheets

(51) Int. Cl.
*H04W 48/12* (2009.01)
*H04W 48/16* (2009.01)
*H04W 52/02* (2009.01)
*H04W 56/00* (2009.01)

(52) U.S. Cl.
CPC ........... *H04L 5/0094* (2013.01); *H04W 48/16* (2013.01); *H04W 52/0229* (2013.01); *H04W 56/0015* (2013.01)

(56) References Cited

U.S. PATENT DOCUMENTS

| | | | | |
|---|---|---|---|---|
| 2022/0418000 | A1* | 12/2022 | Zhang | H04W 74/0833 |
| 2023/0007603 | A1* | 1/2023 | Sui | H04W 72/0453 |
| 2023/0042274 | A1* | 2/2023 | He | H04W 74/0841 |

FOREIGN PATENT DOCUMENTS

| | | |
|---|---|---|
| CN | 110024442 A | 7/2019 |
| CN | 110167107 A | 8/2019 |
| CN | 110168972 A | 8/2019 |
| CN | 110431887 A | 11/2019 |
| WO | WO-2019045633 A1 | 3/2019 |

OTHER PUBLICATIONS

Ericsson (Moderator): "Summary of Rel-17 Email Discussion on NR Network Energy Savings", 3GPP TSG-RAN Meeting #86, RP-192679, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 2, 2019, XP051834285, 9 Pages.
Supplementary European Search Report—EP20897529—Search Authority—The Hague—Nov. 20, 2023.
International Search Report and Written Opinion—PCT/CN2020/131672—ISA/EPO—Mar. 24, 2021.
International Search Report and Written Opinion—PCT/CN2019/122892—ISA/EPO—Jul. 28, 2020.

* cited by examiner

EARLY INDICATION OF NEW RADIO-LIGHT DEDICATED SYSTEM INFORMATION

CROSS REFERENCE TO RELATED APPLICATIONS

The present application is a 371 national stage filing of International PCT Application No. PCT/CN2020/131672 by Li et al., entitled "EARLY INDICATION OF NEW RADIO-LIGHT DEDICATED SYSTEM INFORMATION," filed Nov. 26, 2020; and claims priority to International Patent Application No. PCT/CN2019/122892 by Li et al., entitled "EARLY INDICATION OF NEW RADIO-LIGHT DEDICATED SYSTEM INFORMATION," filed Dec. 4, 2019, each of which is assigned to the assignee hereof, and each of which is expressly incorporated by reference in its entirety herein.

FIELD OF TECHNOLOGY

The following relates generally to wireless communications and more specifically to early indication of new radio-light dedicated system information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may perform a synchronization procedure during initial access to establish a connection via a channel. The UE may receive synchronization signals and system information from a base station. However, the UE may perform a number of steps before receiving the system information. For example, a UE may receive and decode a synchronization signal block, a master information block, a set of control resources, a downlink control channel, and a downlink shared channel to receive the system information. These synchronization steps may be a computation burden on the UE, and conventional techniques for synchronization may have limitations for different types of devices including devices employing coverage enhancement or reduced computational complexity.

SUMMARY

The described techniques relate to improved methods, systems, devices, and apparatuses that support early indication of dedicated system information for a first type of user equipment (UE) (e.g., a new radio-light UE, a reduced capability UE, or low-tier UE). Generally, the described techniques provide for an early indication to a UE that may allow the UE to determine, from the first symbol of a synchronization signal block (SSB), if system information associated with the SSB is intended for the UE. Thus, when the UE receives the indication that the system information (e.g., system information block (SIB), which may include remaining minimum system information (RMSI)) is dedicated to the UE, the UE may determine to receive and decode one or more of a synchronization signal block, a master information block, a control resource set, a downlink control channel, and a downlink shared channel to receive the system information. Additionally or alternatively, a UE may determine that the associated system information is generic (e.g., not dedicated to the UE), and may terminate decoding during reception of the SSB. Thus, the UE may conserve computational resources by avoiding unnecessary decoding.

According to aspects of this disclosure, system information may be dedicated to a type of UE (e.g., a first type such as low-tier or a second type such as premium) or may be generic to all UE types. The system information may be an SIB1 that indicates radio resource configuration signaling and may be transmitted on a downlink shared channel, for example, a physical downlink shared channel (PDSCH). A UE may perform a cell search procedure before receiving the system information dedicated to its UE type. The cell search procedure may include an SSB that may include a primary synchronization signal (PSS) in the first symbol period of the SSB. The early indication discussed herein may surround the PSS in frequency on one or both sides in the same symbol as the PSS. The early indication may be a sequence that may allow more efficient determination for a low-tier UE to perform computationally demanding tasks, such as decoding the SSB, master information block (MIB), type-0 control resource set (CORESET0), physical downlink control channel (PDCCH), and PDSCH to receive an SIB.

A UE may be configured to measure the lower and higher frequencies around the PSS, including above, below, or both, of the PSS in frequency. In some cases, the indication sequence may be composed of two parts, each part on a separated set of subcarriers (e.g., one portion at a higher frequency than the PSS and the other portion at a lower frequency than the PSS) within the same symbol as the PSS of the SSB. The two sequence parts may indicate the same information, different information, or form a single joint sequence. For instance, a UE may receive a PSS on a first set of subcarriers in a symbol period of an SSB and an early system information indication on a second set of subcarriers in the symbol period of an SSB, and may determine, based on the presence of the system information indication in the PSS symbol, that the SSB is associated with system information dedicated for the UE.

A method for wireless communications at a first type of UE is described. The method may include receiving, in a first symbol period of an SSB, a PSS on a first set of subcarriers and a system information indication on a second set of subcarriers, determining, in response to receiving the system information indication, that the SSB is associated with remaining minimum system information dedicated for the first type of UE, and decoding the remaining minimum system information based on a physical broadcast channel signal in a second one or more symbol periods of the SSB based on the determining that the SSB is associated with the remaining minimum system information dedicated for the first type of UE.

An apparatus for wireless communications at a first type of UE is described. The apparatus may include a processor, memory in electronic communication with the processor, and instructions stored in the memory. The instructions may be executable by the processor to cause the apparatus to receive, in a first symbol period of an SSB, a PSS on a first set of subcarriers and a system information indication on a second set of subcarriers, determine, in response to receiving the system information indication, that the SSB is associated with remaining minimum system information dedicated for the first type of UE, and decode the remaining minimum system information based on a physical broadcast channel signal in a second one or more symbol periods of the SSB based on the determining that the SSB is associated with the remaining minimum system information dedicated for the first type of UE.

Another apparatus for wireless communications at a first type of UE is described. The apparatus may include means for receiving, in a first symbol period of an SSB, a PSS on a first set of subcarriers and a system information indication on a second set of subcarriers, means for determining, in response to receiving the system information indication, that the SSB is associated with remaining minimum system information dedicated for the first type of UE, and means for decoding the remaining minimum system information based on a physical broadcast channel signal in a second one or more symbol periods of the SSB based on the determining that the SSB is associated with the remaining minimum system information dedicated for the first type of UE.

A non-transitory computer-readable medium storing code for wireless communications at a first type of UE is described. The code may include instructions executable by a processor to receive, in a first symbol period of an SSB, a PSS on a first set of subcarriers and a system information indication on a second set of subcarriers, determine, in response to receiving the system information indication, that the SSB is associated with remaining minimum system information dedicated for the first type of UE, and decode the remaining minimum system information based on a physical broadcast channel signal in a second one or more symbol periods of the SSB based on the determining that the SSB is associated with the remaining minimum system information dedicated for the first type of UE.

In some examples of the method, apparatuses, and non-transitory computer-readable medium described herein, decoding the remaining minimum system information may include operations, features, means, or instructions for determining that the remaining minimum system information may be dedicated for the first type of UE based on the system information indication, decoding a physical broadcast channel signal of the SSB based on determining the remaining minimum system information may be dedicated for the first type of UE, and decoding a control resource set dedicated for the first type of UE based on the SSB and on the determining that the remaining minimum system information may be dedicated for the first type of UE, where the control resource set dedicated for the first type of UE schedules a downlink shared channel that carries the remaining minimum system information, and where decoding the remaining minimum system information may be further based on decoding the physical broadcast channel signal and the control resource set dedicated for the first type of UE.

In some examples of the method, apparatuses, and non-transitory computer-readable medium described herein, the control resource set dedicated for the first type of UE includes a type-0 control resource set (CORESET0).

Some examples of the method, apparatuses, and non-transitory computer-readable medium described herein may further include operations, features, means, or instructions for determining one or more characteristics of the remaining minimum system information dedicated for the first type of UE, a control resource set dedicated for the first type of UE, or a combination thereof, based on the system information indication, where the one or more characteristics include: repetition levels, a multiplexing type between the SSB and the control resource set dedicated for the first type of UE, a bandwidth category, or a combination thereof.

In some examples of the method, apparatuses, and non-transitory computer-readable medium described herein, the bandwidth category includes a frequency range of the control resource set dedicated for the first type of UE, a frequency offset of the control resource set dedicated for the first type of UE relative to the SSB, or a combination thereof.

In some examples of the method, apparatuses, and non-transitory computer-readable medium described herein, decoding the remaining minimum system information may include operations, features, means, or instructions for determining that the remaining minimum system information may be generic based on the system information indication and terminating decoding of the SSB before the physical broadcast channel signal of the SSB may be decoded based on determining the remaining minimum system information may be generic.

Some examples of the method, apparatuses, and non-transitory computer-readable medium described herein may further include operations, features, means, or instructions for monitoring, in a first symbol period of a second SSB, for the PSS and the system information indication, detecting that the system information indication may be absent from the second SSB, and terminating, based on detecting that the system information indication may be absent, decoding of the second SSB before a physical broadcast channel signal of the second SSB may be decoded by the UE.

In some examples of the method, apparatuses, and non-transitory computer-readable medium described herein, determining that the SSB may be associated with the remaining minimum system information for the first type of UE may include operations, features, means, or instructions for identifying that the SSB may be a cell defining SSB dedicated for the first type of UE based on the system information indication indicating that the SSB may be associated with the remaining minimum system information dedicated for the first type of UE.

In some examples of the method, apparatuses, and non-transitory computer-readable medium described herein, the cell defining SSB dedicated for the first type of UE includes a same identifier as a generic cell defining SSB.

Some examples of the method, apparatuses, and non-transitory computer-readable medium described herein may further include operations, features, means, or instructions for performing cell selection or reselection associated with the first type of UE based on the cell defining SSB being dedicated for the first type of UE.

In some examples of the method, apparatuses, and non-transitory computer-readable medium described herein, receiving the system information indication on the second set of subcarriers may include operations, features, means, or instructions for receiving one or more subcarriers at a higher frequency than the PSS, one or more subcarriers at a lower frequency than the PSS, or a combination thereof.

In some examples of the method, apparatuses, and non-transitory computer-readable medium described herein, the system information indication includes one or more sequences.

In some examples of the method, apparatuses, and non-transitory computer-readable medium described herein, the one or more subcarriers at the higher frequency form a first sequence of the one or more sequences, and the one or more subcarriers at the lower frequency form a second sequence of the one or more sequences.

In some examples of the method, apparatuses, and non-transitory computer-readable medium described herein, the first sequence indicates a value of a first parameter associated with the remaining minimum system information, a control resource set dedicated for the first type of UE, or a combination thereof, and the second sequence indicates a value of a second parameter associated with the remaining minimum system information, the control resource set dedicated for the first type of UE, or a combination thereof.

In some examples of the method, apparatuses, and non-transitory computer-readable medium described herein, the value of the first parameter or the value of the second parameter indicates a direction of a cell defining SSB dedicated for the first type of UE relative to the PSS.

In some examples of the method, apparatuses, and non-transitory computer-readable medium described herein, the value of the first parameter or the value of the second parameter indicates a frequency offset of a cell defining SSB dedicated for the first type of UE relative to the PSS.

In some examples of the method, apparatuses, and non-transitory computer-readable medium described herein, the first sequence and the second sequence indicate a same value for a parameter associated with the remaining minimum system information, a control resource set dedicated for the first type of UE, or a combination thereof.

In some examples of the method, apparatuses, and non-transitory computer-readable medium described herein, the first sequence, the second sequence, or both, indicate a value of a parameter associated with the remaining minimum system information, a control resource set dedicated for the first type of UE, or a combination thereof, and the value of the parameter indicates a direction, or a frequency offset, or both, of a cell defining SSB dedicated for the first type of UE relative to the PSS.

In some examples of the method, apparatuses, and non-transitory computer-readable medium described herein, the one or more subcarriers at the higher frequency and the one or more subcarriers at the lower frequency form a joint sequence.

Some examples of the method, apparatuses, and non-transitory computer-readable medium described herein may further include operations, features, means, or instructions for comparing the one or more sequences to a set of stored sequences to determine that the system information indication may be for the UE.

In some examples of the method, apparatuses, and non-transitory computer-readable medium described herein, the one or more sequences include a multi-stage structure.

In some examples of the method, apparatuses, and non-transitory computer-readable medium described herein, the system information indication includes a first sequence and a second sequence, and the one or more subcarriers at the higher frequency form the first sequence, and the one or more subcarriers at the lower frequency form the second sequence.

In some examples of the method, apparatuses, and non-transitory computer-readable medium described herein, the one or more subcarriers at the higher frequency and the one or more subcarriers at the lower frequency form a joint sequence, the system information indication including the joint sequence.

In some examples of the method, apparatuses, and non-transitory computer-readable medium described herein, the system information indication includes one or more sequences having a multi-stage structure.

In some examples of the method, apparatuses, and non-transitory computer-readable medium described herein, where the first type of UE may be associated with reduced capability (RedCap) UEs, where the first type of UE may be associated with a number of receive antennas that may be below a receive antenna threshold, where the first type of UE may be associated with a number of receive antennas including receive antenna power loss that may be above an antenna gain loss threshold, where the first type of UE may be associated with a number of transmit antennas including transmit antenna power loss that may be above an antenna gain loss threshold, where the first type of UE may be associated with a time ON duration that may be below a time ON threshold, where the first type of UE may be associated with a processing timeline capability that may be below a processing timeline capability threshold, where the first type of UE may be associated with a maximum transmission power that may be below a maximum transmission power threshold, where the first type of UE may be associated with a maximum bandwidth that may be below a maximum bandwidth threshold, and any combination thereof.

In some examples of the method, apparatuses, and non-transitory computer-readable medium described herein, the first type of UE may be a type of low tier UE.

In some examples of the method, apparatuses, and non-transitory computer-readable medium described herein, the first type of UE may be a generic UE.

A method for wireless communications at a base station is described. The method may include generating a system information indication for an SSB that indicates that the SSB is associated with remaining minimum system information for a first type of UE, transmitting, in a first symbol period of the SSB, a PSS on a first set of subcarriers and the system information indication on a second set of subcarriers, and transmitting, based on transmitting the system information indication, the remaining minimum system information dedicated for the first type of UE.

An apparatus for wireless communications at a base station is described. The apparatus may include a processor, memory in electronic communication with the processor, and instructions stored in the memory. The instructions may be executable by the processor to cause the apparatus to generate a system information indication for an SSB that indicates that the SSB is associated with remaining minimum system information for a first type of UE, transmit, in a first symbol period of the SSB, a PSS on a first set of subcarriers and the system information indication on a second set of subcarriers, and transmit, based on transmitting the system information indication, the remaining minimum system information dedicated for the first type of UE.

Another apparatus for wireless communications at a base station is described. The apparatus may include means for generating a system information indication for an SSB that indicates that the SSB is associated with remaining minimum system information for a first type of UE, means for transmitting, in a first symbol period of the SSB, a PSS on a first set of subcarriers and the system information indication on a second set of subcarriers, and means for transmitting, based on transmitting the system information indication, the remaining minimum system information dedicated for the first type of UE.

A non-transitory computer-readable medium storing code for wireless communications at a base station is described. The code may include instructions executable by a processor to generate a system information indication for an SSB that indicates that the SSB is associated with remaining minimum system information for a first type of UE, transmit, in a first symbol period of the SSB, a PSS on a first set of subcarriers and the system information indication on a second set of subcarriers, and transmit, based on transmitting the system information indication, the remaining minimum system information dedicated for the first type of UE.

Some examples of the method, apparatuses, and non-transitory computer-readable medium described herein may further include operations, features, means, or instructions for transmitting, based on transmitting the PSS, a physical broadcast channel signal in a second one or more symbol periods of the SSB and transmitting, based on transmitting the physical broadcast channel signal, a control resource set dedicated for the first type of UE, where the control resource set dedicated for the first type of UE schedules a downlink shared channel that carries the remaining minimum system information, and where transmitting the system information indication indicates that the remaining minimum system information may be dedicated for the first type of UE.

In some examples of the method, apparatuses, and non-transitory computer-readable medium described herein, the control resource set dedicated for the first type of UE includes a type-0 control resource set (CORESET0).

Some examples of the method, apparatuses, and non-transitory computer-readable medium described herein may further include operations, features, means, or instructions for identifying one or more characteristics of the remaining minimum system information, a control resource set dedicated for the first type of UE, or a combination thereof in the system information indication, where the or more characteristics include: repetition levels, a multiplexing type between the SSB and the control resource set dedicated for the first type of UE, a bandwidth category, or a combination thereof.

In some examples of the method, apparatuses, and non-transitory computer-readable medium described herein, the bandwidth category includes a frequency range of the control resource set dedicated for the first type of UE, frequency offset of the control resource set dedicated for the first type of UE relative to the SSB, or a combination thereof.

Some examples of the method, apparatuses, and non-transitory computer-readable medium described herein may further include operations, features, means, or instructions for transmitting the system information indication indicates that the remaining minimum system information may be generic.

In some examples of the method, apparatuses, and non-transitory computer-readable medium described herein, the SSB may be a cell defining SSB dedicated for the first type of UE based on the system information indication indicating that the SSB may be associated with the remaining minimum system information dedicated for the first type of UE.

In some examples of the method, apparatuses, and non-transitory computer-readable medium described herein, the cell defining SSB dedicated for the first type of UE includes a same identifier as a generic cell defining SSB.

In some examples of the method, apparatuses, and non-transitory computer-readable medium described herein, transmitting the system information indication in the first symbol period on the second set of subcarriers may include operations, features, means, or instructions for transmitting the system information indication in one or more subcarriers at a higher frequency than the PSS, one or more subcarriers at a lower frequency than the PSS, or a combination thereof.

In some examples of the method, apparatuses, and non-transitory computer-readable medium described herein, the system information indication includes one or more sequences.

Some examples of the method, apparatuses, and non-transitory computer-readable medium described herein may further include operations, features, means, or instructions for generating a first sequence of the one or more sequences for the one or more subcarriers at the higher frequency and generating a second sequence of the one or more sequences for the one or more subcarriers at the lower frequency.

In some examples of the method, apparatuses, and non-transitory computer-readable medium described herein, the first sequence indicates a value of a first parameter associated with the remaining minimum system information, a control resource set dedicated for the first type of UE, or a combination thereof, and the second sequence indicates a value of a second parameter associated with the remaining minimum system information, the control resource set dedicated for the first type of UE, or a combination thereof.

In some examples of the method, apparatuses, and non-transitory computer-readable medium described herein, the value of the first parameter or the value of the second parameter indicates a direction of a cell defining SSB dedicated for the first type of UE relative to the PSS.

In some examples of the method, apparatuses, and non-transitory computer-readable medium described herein, the value of the first parameter or the value of the second parameter indicates a frequency offset of a cell defining SSB dedicated for the first type of UE relative to the PSS.

In some examples of the method, apparatuses, and non-transitory computer-readable medium described herein, the first sequence and the second sequence indicate a same value for a parameter associated with the remaining minimum system information, a control resource set dedicated for the first type of UE, or a combination thereof.

In some examples of the method, apparatuses, and non-transitory computer-readable medium described herein, the one or more subcarriers at the higher frequency and the one or more subcarriers at the lower frequency form a joint sequence.

In some examples of the method, apparatuses, and non-transitory computer-readable medium described herein, the one or more sequences include a multi-stage structure.

In some examples of the method, apparatuses, and non-transitory computer-readable medium described herein, the first type of UE may be a type of low tier UE.

In some examples of the method, apparatuses, and non-transitory computer-readable medium described herein, the first type of UE may be a generic UE.

DETAILED DESCRIPTION

Figure 1:
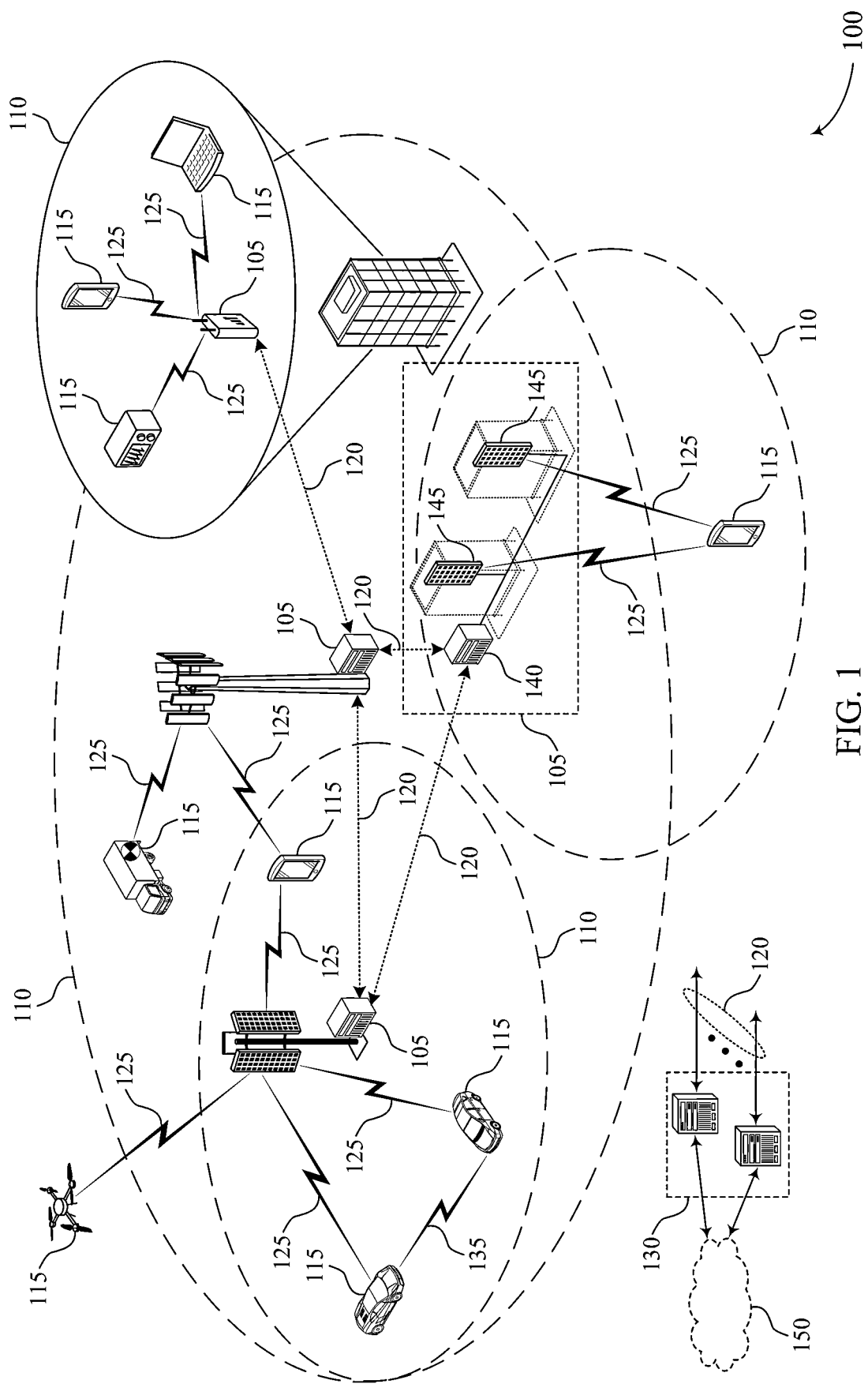
FIG. 1 illustrates an example of a system for wireless communications that supports early indication of new radio-light dedicated system information in accordance with aspects of the present disclosure.

The described techniques relate to improved methods, systems, devices, and apparatuses that support early indication of new radio-light dedicated system information. Generally, the described techniques provide for an early indication to a user equipment (UE) that may allow the UE to determine, from the first symbol of a synchronization signal block (SSB), if the system information associated with the SSB is intended for the UE. Thus, when the UE receives the indication that the system information (e.g., a system information block (SIB), which may contain remaining minimum system information (RMSI)) is dedicated to the UE, the UE may determine to receive and decode an SSB, a master information block (MIB), a control resource set (CORESET), a downlink control channel, and a downlink shared channel to receive the system information. Additionally, a UE may determine that the system information corresponding to the SSB is generic (e.g., not dedicated to the UE), and terminate decoding during reception of the SSB. Thus, the UE may conserve computational resources by avoiding unnecessary decoding. This early indication method is more computational-friendly for UEs, such as power-limited NR-light UEs (which also may be referred to as reduced capability UEs), than brute force decoding of all SSBs, MIB, the CORESET, the downlink control channel, and the downlink shared channel to receive the system information.

In some examples, system information may be dedicated to a type of UE, such as a low-tier UE, which may also be referred to as a New Radio (NR)-Light UE, a reduced capability (RedCap) UE, or a premium UE. A low-tier UE may operate with one or more of a reduced transmit power, a reduced number of transmit and/or receive antennas, a reduced transmit/receive bandwidth, or reduced computational complexity. For example, a low-tier UE may be a smart wearable device, an industrial sensor, or a video surveillance device. The described techniques provide for a method of indicating, by a base station, if an SIB is for an NR-light UE in an SSB, which can reduce an NR-Light UE's need to use brute force to decode all decodable SSBs to get to all SIB1(s) across all available SSBs to find NR-Light specific SIB1 configurations.

In some examples, system information may be dedicated to a type of UE (e.g., low-tier type or premium type) or be generic to all UE types. The system information may be an SIB1 that indicates radio resource configuration signaling and may be transmitted on a downlink shared channel, for example, the physical downlink shared channel (PDSCH). A UE may perform a cell search procedure before receiving the system information dedicated to its UE type. For example, a UE may tune to the frequency of a cell and then attempt to receive and decode the SSB. More specifically, the SSB may include a primary synchronization signal (PSS) in the first symbol period of the SSB. The early indication discussed herein may surround the PSS in frequency on one or both sides in the same symbol as the PSS. The early indication may be a sequence that may allow for a more efficient determination for an NR-Light UE to perform computationally demanding tasks, such as decoding the SSB, MIB, type-0 CORESET (CORESET0), physical downlink control channel (PDCCH), and PDSCH to receive an SIB.

According to aspects of this disclosure, a UE may be configured to measure the lower and higher frequencies around the PSS of the SSB for an early indication. In some cases, the indication sequence may be composed of two parts, each part on a separated set of subcarriers (e.g., one portion at a higher frequency than the PSS and the other portion at a lower frequency than the PSS) within the same symbol as the PSS of the SSB. The two sequence parts may indicate the same information, different information, or form a single joint sequence. For instance, a UE may receive a PSS on a first set of subcarriers in a symbol period of an SSB and an early system information indication on a second set of subcarriers in the symbol period of an SSB, and determine, based on the presence of the system information indication in the PSS symbol, that the SSB is associated with system information dedicated for the UE. Accordingly, the UE may proceed to decode the physical broadcast channel (PBCH) and secondary synchronization signal (SSS) of the SSB, control resources, the system information, and more based on determining that the SSB is associated with the system information dedicated for the UE.

The early indication may be in the same symbol period as the PSS of an SSB, which may be in the first symbol of the SSB and may thus allow NR-light UEs to avoid an increased amount of unnecessary decoding of PBCH and SSS in SSBs, as well as MIBs, PDCCHs, and SIBs (e.g., SIB1), when the SIB is not for NR-light UEs. The indication may include one or more sequences adjacent the PSS in frequency (sequence may be orthogonal or low correlation). Additionally, NR-light specific SSBs, for example, those with NR-light SIB(s), may be designed to reduce computational complexity for the NR-light UEs.

In some cases, if no indication sequence is detected, then the NR-Light UE may determine that no NR-Light dedicated SIB is associated with the corresponding SSB. As a result, the UE may terminate decoding of the SSB. In some examples, different sequences may allow the NR-Light UE to identify the existence or non-existence of a NR-Light dedicated SIB. Additionally or alternatively, the early indication may also identify the sub-categories of the NR-Light dedicated SIB1 and/or CORESET0.

Aspects of the disclosure are initially described in the context of wireless communications systems. Aspects of the disclosure are further illustrated by and described with reference to apparatus diagrams, system diagrams, and flowcharts that relate to early indication of new radio-light dedicated system information.

FIG. 1 illustrates an example of a wireless communications system 100 that supports early indication of new radio-light dedicated system information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may monitor the first symbol of SSB for a PSS and a system information (SI) indication to determine if the SSB is associated with SI dedicated for UE 115, for example, dedicated based on the type of UE 115. Example UE types may include NR-Light UEs 115 (which may also be referred to as reduced capability (RedCap) UEs 115) or premium UEs 115. An SI indication may include a sequence that fills the subcarriers residing on both sides of the PSS. The two SI indication portions may form a single sequence jointly, or form more than one sequence separately by each side. Base station 105 may generate an SI indication for an SSB that indicates that the SSB is associated with SI dedicated for a first type of UE 115. The SI indication may allow for more efficient operation of NR-Light UEs 115.

A premium UE 115 may use an SSB that is associated with an NR-Light dedicated SIB, or the premium UE 115 may ignore the SSB that is associated with an NR-Light dedicated SIB and instead use a different premium or generic SSB. An NR-Light UE 115 may proceed with the synchronization and decoding of SSB associated with an NR-Light dedicated SIB when an SI indication is detecting with the PSS. Alternatively, an NR-Light UE 115 may not proceed with the synchronization and decoding of an SSB not associated with an NR-Light dedicated SIB. Thus, an NR-Light UE 115 may conserve power when there is not an NR-Light dedicated SIB by avoiding unnecessary decoding computations.

The example techniques described with reference to NR-Light UEs 115 and premium UEs 115 may be applied in other examples to distinguish other types, categories, classes, etc., of UEs. For example, the example techniques may be applied to any first type of UE 115 and any second type of UE 115, including additional types of UEs (e.g., third or fourth types of UEs 115).

Figure 2:
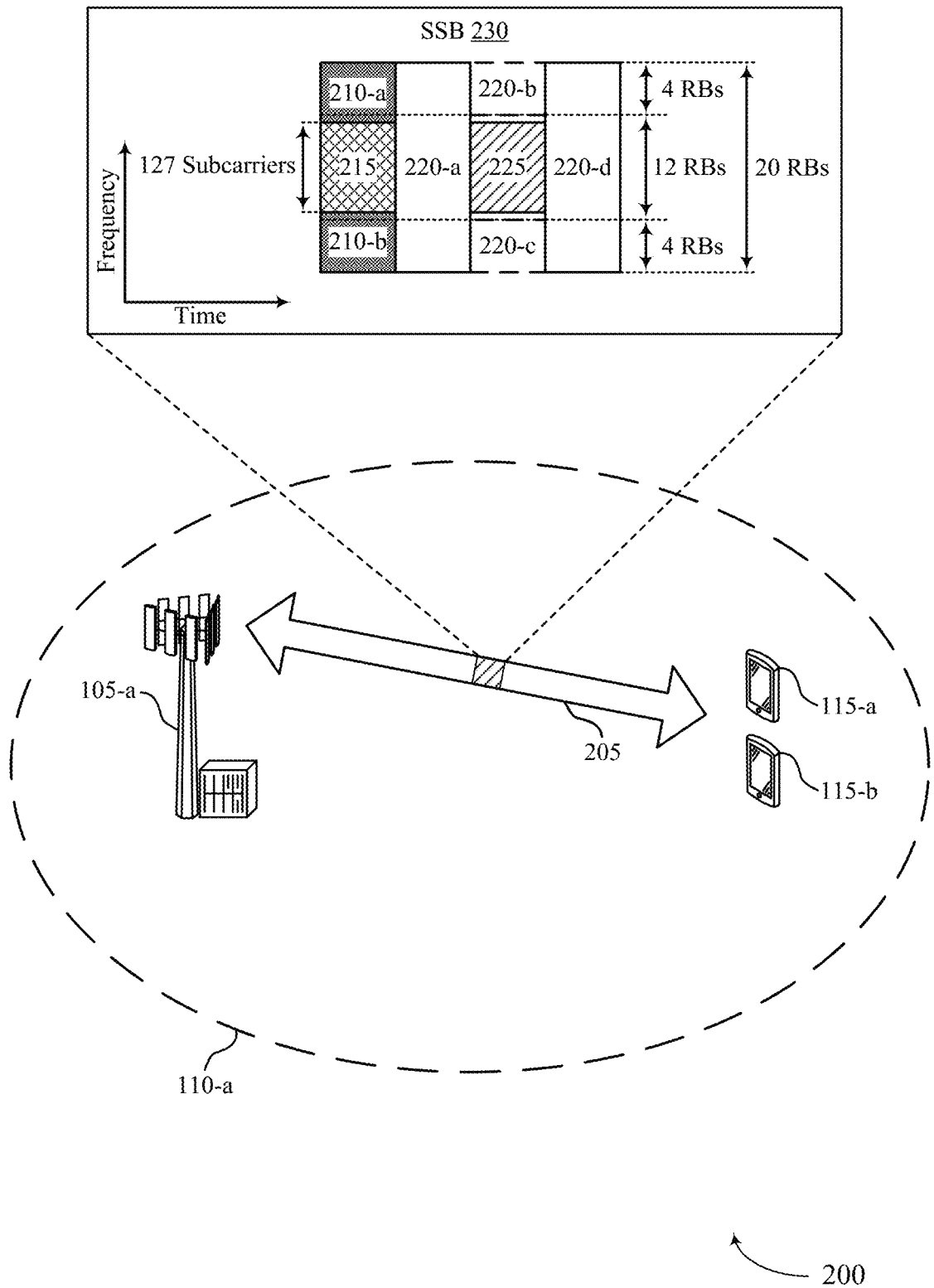
FIG. 2 illustrates an example of a system for wireless communications that supports early indication of new radio-light dedicated system information in accordance with aspects of the present disclosure.

FIG. 2 illustrates an example of a wireless communications system 200 that supports early indication of new radio-light dedicated system information in accordance with aspects of the present disclosure. In some examples, wireless communications system 200 may implement aspects of wireless communication system 100. Wireless communications system 200 may include base station 105-a and UEs 115-a and 115-b, which may be examples of base station 105 and UE 115, respectively, as described with reference to FIG. 1. Base station 105-a and UEs 115-a and 115-b may be configured to use an early indication of dedicated system information conveyed in the SSB 230.

Base station 105-a may be an NR base station communicating via link 205 with UEs 115-a and 115-b within coverage area 110-a. In some examples, UE 115-a may be a first type of UE and UE 115-b may be a second type of UE. For example, UE 115-a may be a reduced capability UE. The first type of UE may be associated with a number of receive antennas that is below a receive antenna threshold. In some cases, the first type of UE may be associated with a number of receive or transmit antennas that include a receive or transmit antenna power loss, respectively, that is above an antenna gain loss threshold. In some other examples, the first type of UE may be associated with a time ON duration that is below a time ON threshold, a processing timeline capability that is below a processing timeline capability threshold, a maximum transmission power that is below a maximum transmission power threshold, a maximum bandwidth that is below a maximum bandwidth threshold, or some combination thereof.

Base station 105-a may transmit at least one SSB 230 to UEs 115-a and 115-b. SSB 230 may be used by a UE 115 to synchronize with a cell (e.g., base station 105-a). The SSB 230 may include four OFDM symbols (symbol periods). The first symbol may include one or more SI Indications 210 and PSS 215. In some examples, the PSS 215 may occupy 127 subcarriers. The one or more SI Indications 210 may fill up to the remaining subcarriers, for example, 20 resource blocks (RBs). In other examples, the one or more SI Indications 210 may occupy a subset of the remaining subcarriers, for example leaving a buffer or barrier between SI Indications 210 and PSS 215 in frequency. The second and fourth symbols may include PBCH 220-a and 220-d, respectively, which may each span the 20 RBs. The third symbol may include two PBCH portions 220-b, each spanning 4 RBs, and 220-c, as well as SSS 225, which may occupy 127 subcarriers.

In some cases, SSB 230 may be a cell defining SSB. For example, within the frequency span of a carrier, multiple SSBs 230 may be transmitted by the base station 105-a to UEs 115-a and 115-b. The Physical Cell Identifiers (PCIs) of SSBs 230 transmitted in different frequency locations do not have to be unique to the cell. Thus, the PCIs may not be the same, and different SSBs in the frequency domain may have different PCIs. When an SSB 230 is associated with remaining minimum system information (RMSI), the SSB 230 may correspond to an individual cell, which may have a unique NR Cell Global Identifier (NCGI). Such an SSB 230 with the unique NCGI may be referred to as a cell defining SSB. In some cases, cell selection and/or reselection, by a UE 115, may be based on one or more reference signal receive power (RSRP) or reference signal receive quality (RSRQ) measurements of the cell defining SSB.

After a UE 115 receives the SSB 230, the UE 115 may decode the SSB to identify the MIB. The MIB may indicate the CORESET and synchronization signal configuration, which may allow the UE 115 to receive and decode the PDCCH. The PDCCH may indicate the PDSCH to the UE 115, which may include the SIB that includes the RMSI. In some cases, a first type of UE, such as a low tier UE 115-a (e.g., an NR-Light UE 115-a, which may be referred to as a reduced capability UE 115-a) may include lower UE capabilities compared to a second type of UE, such as a premium UE (e.g., UE 115-b), and some additional radio resource control (RRC) parameters dedicated to NR-Light UE 115-a may be useful in an SIB (e.g., SIB1) to allow successful initial access by UE 115-a. For instance, low tier UE 115-a may request different types of physical random access channel (PRACH) procedures, preamble formats, or repetition levels of a physical uplink shared channel (PUSCH) and a physical downlink shared channel (PDSCH), which may all require dedicated RRC configurations via SIB1 (e.g., an NR-Light dedicated SIB1).

In some cases, it may not be possible for all SSBs 230 or at least for all base stations 105 to include an NR-Light dedicated SIB1. For example, depending on network implementations, some SSBs 230 within the overall bandwidth may be able to be used for premium UEs (e.g., UE 115-b). Thus, the SIB1 may indicate parameters non-suitable for NR-Light UEs (e.g., UE 115-a). In some cases, a base station 105 may not contain NR-Light dedicated SIB1 parameters. If an SSB 230 is does not include an NR-Light dedicated SIB1, it would be beneficial for the absence of the NR-Light dedicated SIB1 to be indicated to NR-Light UEs (e.g., UE 115-a). Thus, allowing UE 115-a to avoid using a brute force method to decode all decodable SIBs (e.g., across all available SSBs 230 and/or base stations 105) to find NR-Light dedicated SIB1 configurations using an early indication (e.g., SI Indication 210) is beneficial to UE 115-a by avoiding computation-heavy procedures for such power-limited UEs 115.

The SI Indication 210 may enable early indication for UE 115-a of the existence of NR-Light dedication configurations (e.g., dedicated SIB1 and/or CORESET configurations). Further, the SI Indication 210 may include sequence based symbols within the SSB 230 where previous null carriers were included. For example, the SI Indication 210 may reside in the upper and lower frequencies around the PSS 215 within the first symbol of SSB 230. The y axis of SSB 230 may show frequency while the x axis shows time. The inclusion of SI Indication 210 may provide lower computational complexity and thus reduce power consumption for an NR-Light UE 115-a as NR-Light UE 115-a may not have to use brute force to decode MIB and SIB1 and to find appropriate SSBs for initial access.

UEs 115-a and 115-b may monitor the 20 RBs (or one or more subsets of the 20 RBs) in the first symbol of SSB 230 for the PSS 215 and both sides of the PSS 215 for an SI Indication 210. SI Indication 210 may include sequence based symbols, and the subcarriers residing on both sides of the PSS 215 (SI Indication 210-a and 210-b) may form a single sequence jointly, or form more than one sequence separately by each side. In some examples, if two sequences may be identified from SI Indication 210-a, the upper edge (e.g., higher frequency), and SI Indication 210-b, the lower edge (e.g., lower frequency), relative to the PSS 215, the SI Indications 210-a and 210-b may provide the same or different information. The sequences of SI Indications 210-a and 210-b and their associations with the SIB1's existence and optionally structure may be stored at the UEs 115-a and 115-b and base station 105-a.

If UE 115-b is a premium UE and SSB 230 is associated with an NR-Light dedicated SIB, then premium UE 115-b may use SSB 230 or ignore SSB 230 and instead use a premium or generic SSB 230. If UE 115-a is a low tier, NR-Light UE and SSB 230 is associated with an NR-Light dedicated SIB, UE 115-a may proceed with the synchronization and decoding of SSB 230. Alternatively, if UE 115-a is a low tier, NR-Light UE and SSB 230 is not associated with an NR-Light dedicated SIB, UE 115-a may not proceed with the synchronization and decoding of SSB 230 (e.g., terminating decoding of the second symbol PBCH 220-a).

Figure 3:
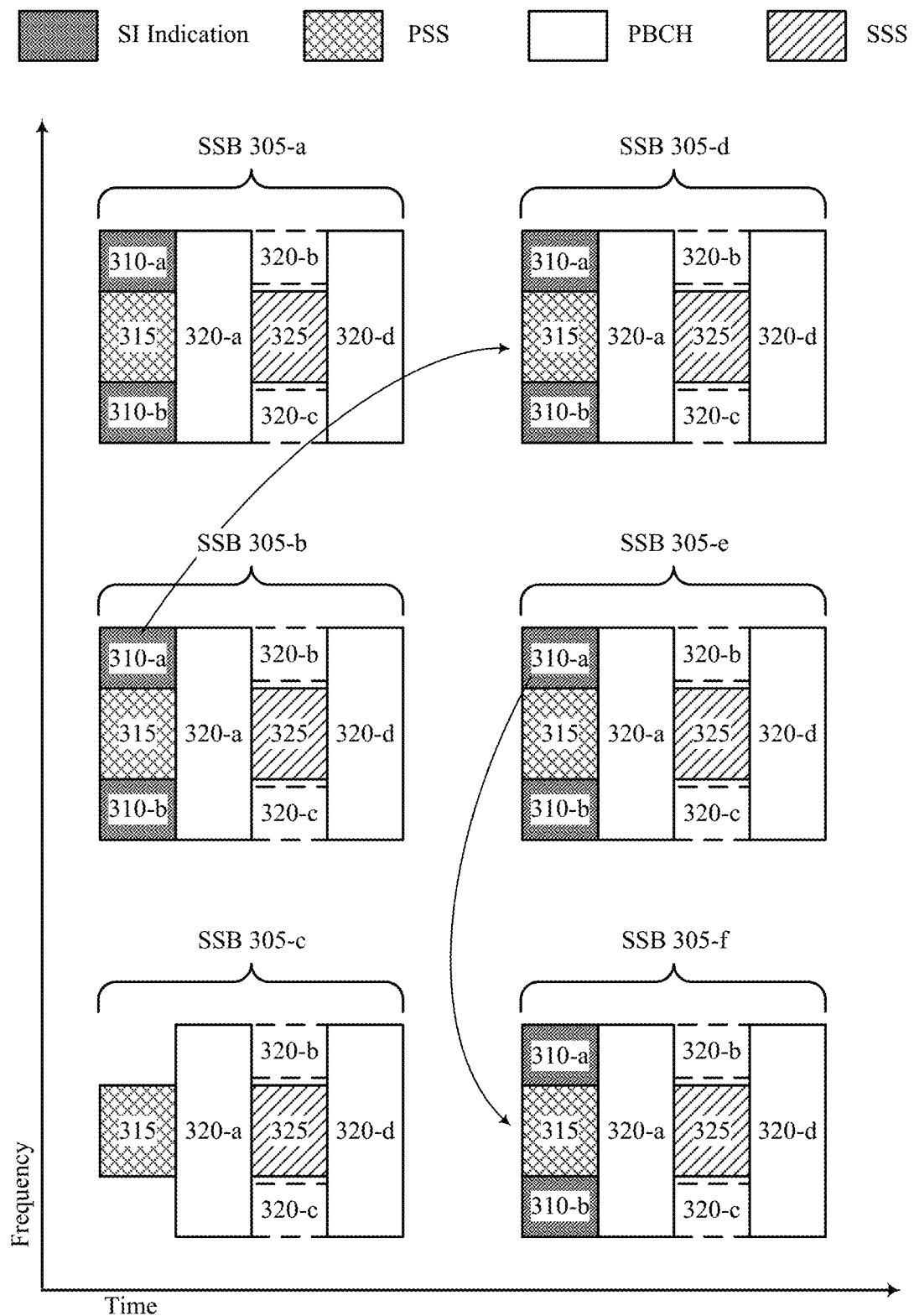
FIG. 3 illustrates an example of a synchronization signal block configuration that supports early indication of new radio-light dedicated system information in accordance with aspects of the present disclosure.

FIG. 3 illustrates an example of a synchronization signal block configuration 300 that supports early indication of new radio-light dedicated system information in accordance with aspects of the present disclosure. In some examples, synchronization signal block configuration 300 may implement aspects of wireless communication system 100. The synchronization signal block configuration 300 may include at least one SSB 305. For example, six SSBs 305 are shown. The SSBs 305 may be transmitted from a base station 105 to UE 115 as described above with reference to FIG. 2.

The SSBs 305 are shown with frequency along the y axis and time along the x axis. In some cases, an SSB burst including multiple SSBs 305 may be time division multiplexed (TDM) or frequency division multiplexed (FDM). TDM SSBs 305 may be spread out in time at a same frequency, whereas FDM SSBs 305 may be spread out in frequency at a same time. For example, SSBs 305-a, 305-b, and 305-c may be FDM in a first time period, and SSBs 305-d, 305-e, and 305-f may be FDM in a subsequent time period. SSBs 305-a and 305-d may be TDM in a first frequency while SSBs 305-b and 305-e may be TDM in a second lower frequency, and so on with SSBs 305-c and 305-f. Each SSB 305 may include a PSS 315 in the first symbol, a PBCH 320-a in the second symbol, SSS 325 and PBCHs 320-b and 320-c in the third symbol, and a PBCH 320-d in the fourth symbol. Additional or fewer symbols may be present in the SSB 305. In some cases, an SI Indication 310 may fill at least some of the subcarriers in the first symbol that are not used by the PSS 315. For example, SI Indication 310-a may occupy a set of subcarriers at a higher frequency than the PSS 315 and/or SI Indication 310-b may occupy a set of subcarriers at a lower frequency than the PSS 315.

In some cases, UEs 115 may monitor the bandwidth of the PBCHs 320-a and 320-d in the first symbol of SSB 305 for the PSS 315 and both sides of the PSS 315 for the SI Indication 210. SI Indication 210 may include sequence based symbols, and the subcarriers residing on both sides of the PSS 315 (SI Indication 310-a and 310-b) may form a single sequence jointly, or form more than one sequences separately by each side. In some examples, if two sequences may be identified from SI Indication 310-a and SI Indication 310-b, the SI Indications 210-a and 210-b may provide the same or different information.

In some examples, there may be at least two methods for a UE 115 to determine that no dedicated SI for the UE is associated with an SSB 305. For example, a UE 115 may monitor the first symbol of SSB 305-*a* and receive SI Indication 310 and PSS 315. The SI Indication 310 may convey that no dedicated SI is associated with the SSB 305-*a*. In another example, a UE 115 may monitor the first symbol of SSB 305-*c* and receive PSS 315 but no SI Indication 310. From the absence of an SI indication 310 in the first symbol of the SSB 305-*c*, the UE 115 may determine that no dedicated SI is associated with the SSB 305-*c*. In both cases, the UE 115 may terminate decoding of the SSBs 305.

A UE 115 may monitor the first symbol of SSB 305-*b* and receive SI Indication 310 and PSS 315. The SI Indication 310 may convey that a dedicated SI is associated with the SSB 305-*b*. Different sequences of the SI Indication 310 may allow a UE 115 (e.g., an NR-Light UE, which may be referred to as a reduced capability UE) to identify the existence and/or non-existence of an NR-Light dedicated SIB, and optionally identify the sub-categories of the NR-Light dedicated SIB1 or CORESET0. In some examples, the sub-categories may include one or more of supported repetition levels for downlink or uplink or both, a CORESET (e.g., CORESET0) and SSB multiplexing type (e.g., FDM or TDM), and bandwidth related categories that may include a frequency domain range and/or frequency domain offset of the dedicated CORESET, in comparison to the SSB 305. These categorization indications may help the UE 115 to decide whether its bandwidth, power, and antenna capabilities may support the decoding of such CORESET or preamble-transmission.

One or more SSBs 305 may be an NR-Light cell defining (CD) SSB 305. In other words, an SSB 305 associated with an NR-Light dedicated SIB that carries the same NCGI as a generic cell defining SSB 305 is also located on the synchronization raster. In some examples, cell selection/reselection of an NR-Light UE 115 may be based on the reference signal measurements (e.g., RSRP or RSRQ) of the NR-Light CD-SSB.

In some cases, the sequence of SI Indication 310 may include a multi-stage structure as described below with reference to FIG. 4. Additionally or alternatively, the sequence of SI Indication 310 may include a direction and frequency range indication of an NR-Light cell defining SSB 305. The SI Indication 310 sequences may provide side information regarding the direction or offset (e.g., frequency or time) of the next available NR-Light cell defining SSB 305. In some examples, if the SSB 305 is not an NR-Light cell defining SSB 305, for example, if the SSB 305 is not associated with an NR-Light dedicated SIB, then the sequence of SI Indication 310-*a* on the upper edge (at a higher frequency than PSS 315) may indicate the relative direction for a cell-defining SSB of NR light and the sequence of SI Indication 310-*b* on the lower edge (at a lower frequency than PSS 315) may indicate the frequency domain offset (e.g., on a sync raster) for a cell defining SSB 305 of NR-Light.

For example, SSB 305-*b* may or may not be associated with an NR-Light SIB, and the SI Indication 310-*a* sequence of SSB 305-*b* may indicate the relative direction (e.g., time and frequency with respect to SSB 305-*b*) for a cell-defining SSB 305-*d* of NR-Light. Additionally or alternatively, the SI Indication 310-*b* sequence of SSB 305-*b* may indicate the frequency domain offset for a cell defining SSB 305-*d* of NR-Light. In another example, SSB 305-*e* may or may not be associated with an NR-Light SIB, and the SI Indication 310-*a* sequence of SSB 305-*e* may indicate the relative direction (e.g., frequency with respect to SSB 305-*e*) for a cell-defining SSB 305-*f* of NR-Light.

In some cases, there may be multiple types of cell defining SSBs 305 and non-cell defining SSBs 305. For instance, SSB 305-*a* may be a cell defining SSB for premium UEs, SSB 305-*b* may be a cell defining SSB for NR-Light UEs, SSB 305-*f* may be a non-cell defining SSB for premium UEs, and SSB 305-*c* may be a non-cell defining SSB for NR-Light UEs. SI Indication 310 may be included with PSS 315 of all types of SSBs. In some cases, SI Indication 310 may not be included with PSS 315 of SSB 305-*c*, a non-cell defining SSB for NR-Light UEs.

Figure 4:
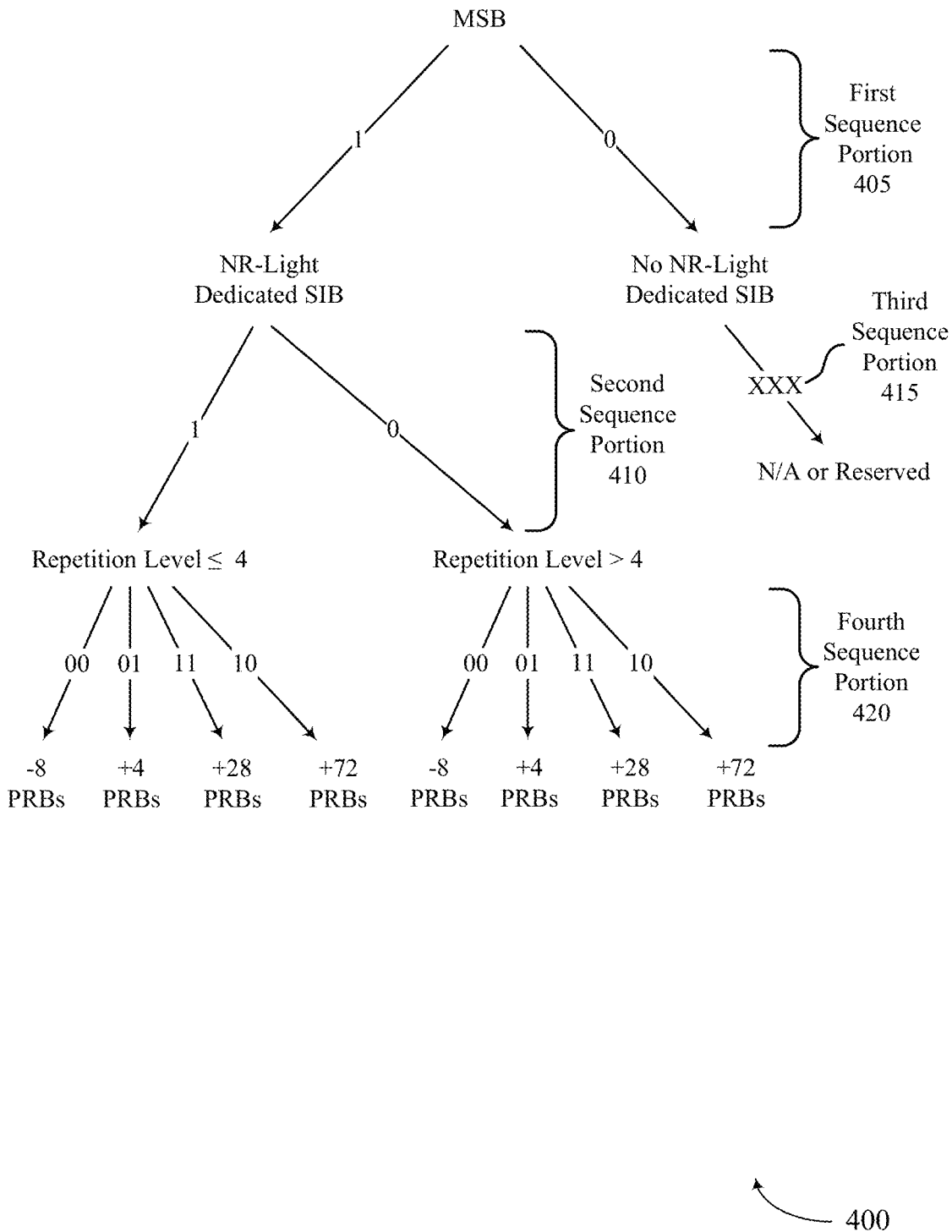
FIG. 4 illustrates an example of a multi-stage sequence that supports early indication of new radio-light dedicated system information in accordance with aspects of the present disclosure.

FIG. 4 illustrates an example of a multi-stage sequence 400 that supports early indication of new radio-light dedicated system information in accordance with aspects of the present disclosure. In some examples, multi-stage sequence 400 may implement aspects of wireless communication system 100.

In some examples, an SI indication may be a sequence similar to the neighboring PSS sequence in the SSB. For example, the sequence may be an m sequence or a Zadoff-Chu sequence. In other examples, other sequences may be used to provide the indication. In some examples, any sequence detectable by a UE that fits within the RB (e.g., 20 RB or less in size) and is adjacent to the PSS in frequency to provide an indication may be used to convey the indication. As shown in FIG. 4, the one or more sequences may comprise a multi-stage structure or form a hierarchical structure.

Starting from the most significant bit (MSB) of the sequence, the first sequence portion 405 may include at least one bit (e.g., 0 or 1), where 0 may indicate that no NR-Light dedicated SIB is associated with the SSB carrying the SI indication and 1 may indicate the presence of NR-Light dedicated SIB associated with the SSB carrying the SI indication. In the case of no NR-Light dedicated SIB, the remainder of the sequence, such as third sequence portion 415 including 4 bits, may be null or reserved.

When the first sequence portion 405 indicates there is an NR-Light dedicated SIB, the second sequence portion may include at least one bit and may indicate the repetition level of uplink and/or downlink communications. For example, 1 may indicate a repetition level less than or equal to four, and 0 may indicate a repetition level greater than four. The fourth sequence portion 420 may follow the second sequence portion 410 and may include at least two bits that indicate the frequency domain range of an NR-Light dedicated CORESET relative to the frequency domain range of the SSB that contains the indication. For instance, 00 may indicate a frequency range 8 PRBs lower in frequency than the SSB, 01 may indicate a frequency range 4 PRBs higher in frequency than the SSB, 10 may indicate a frequency range 28 PRBs higher in frequency than the SSB, and 11 may indicate a frequency range 72 PRBs higher in frequency than the SSB.

Figure 5:
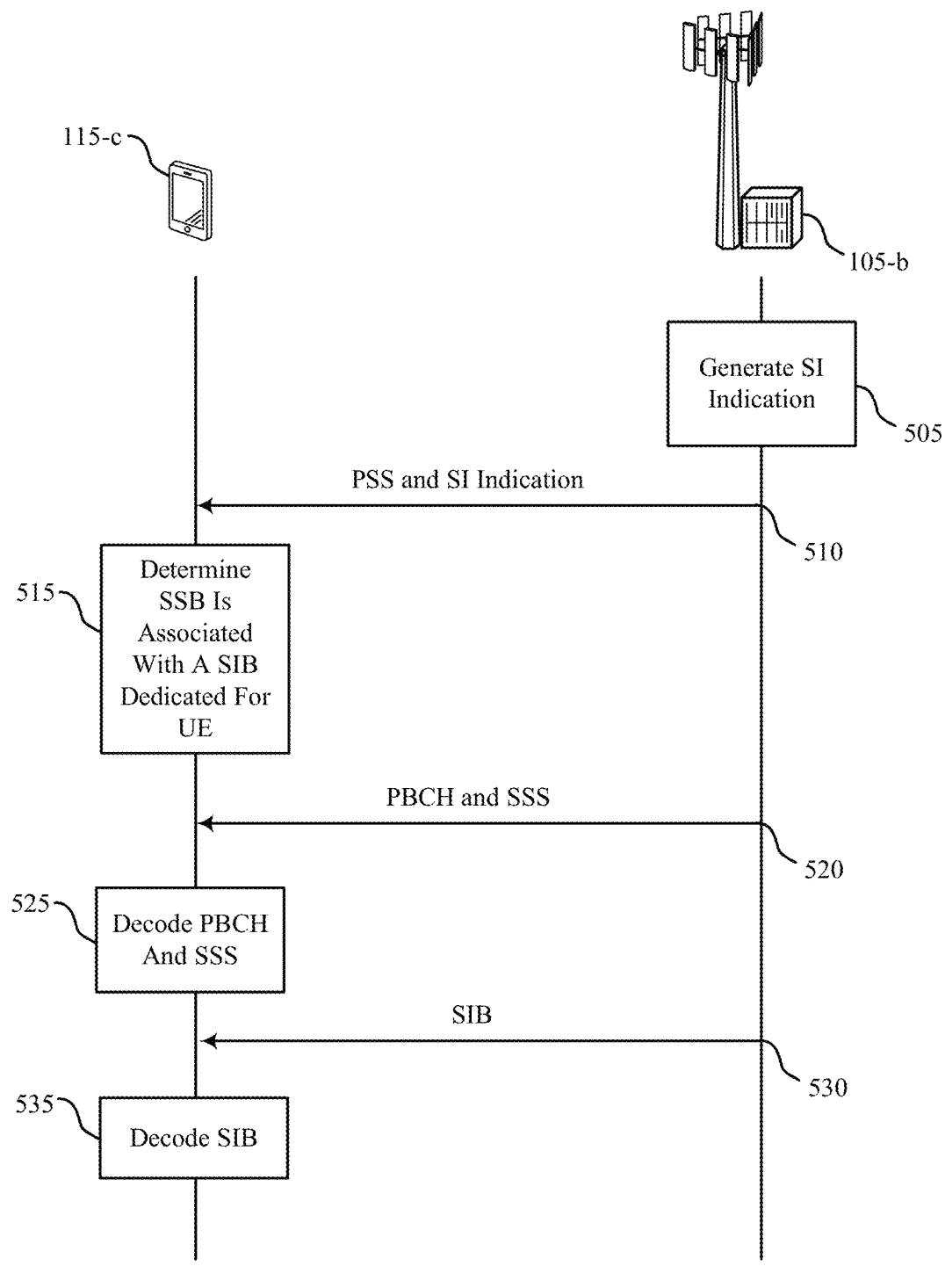
FIG. 5 illustrates an example of a process flow that supports early indication of new radio-light dedicated system information in accordance with aspects of the present disclosure.

FIG. 5 illustrates an example of a process flow 500 that supports early indication of new radio-light dedicated system information in accordance with aspects of the present disclosure. In some examples, process flow 500 may implement aspects of wireless communication system 100. Process flow 500 is shown as being implemented by UE 115-*c* and base station 105-*b*, which may be examples of the UEs 115 and base stations 105 as described with respect to FIGS. 1 and 2. For example, UE 115-*c* may be an example of UE 115-*a* of FIG. 2, and base station 105-*b* may be an example of base station 105-*a* of FIG. 2.

In the following description of the process flow 500, the operations of UE 115-c and base station 105-b may occur in a different order than the exemplary order shown. Certain illustrated operations may also be left out of the process flow 500, or other operations may be added to the process flow 500. It is to be understood that while UE 115-c and base station 105-b are shown performing a number of the operations of process flow 500, any wireless device may perform the operations shown.

At 505, base station 105-b may generate an SI indication for an SSB that indicates that the SSB is associated with system information (e.g., an SIB) for a first type of UE (e.g., a low tier UE, a reduced capability UE, etc.). In some cases, the system information indication includes one or more sequences. For instance, one or more subcarriers at a higher frequency form a first sequence of the one or more sequences, and one or more subcarriers at the lower frequency form a second sequence of the one or more sequences. In some examples, the first sequence indicates a value of a first parameter (e.g., a direction of a cell defining synchronization signal block relative to the primary synchronization signal) associated with the system information, a set of control resources, or both, and the second sequence indicates a value of a second parameter (a frequency offset of a cell defining synchronization signal block relative to the primary synchronization signal) associated with the system information, the set of control resources, or both.

At 510, base station 105-b may transmit, and UE 115-c may receive, in a first symbol period of a synchronization signal block, a primary synchronization signal (PSS) on a first set of subcarriers and a system information (SI) indication on a second set of subcarriers. In some examples, the base station 105-b may transmit, and UE 115-c may receive, one or more subcarriers at a higher frequency than the PSS, one or more subcarriers at a lower frequency than the PSS, or both.

At 515, UE 115-c may determine, in response to receiving the system information indication, that the SSB is associated with system information dedicated for the first type of UE. Thus, the presence of the system information indication indicates that the SSB is associated with system information dedicated for the first type of UE.

At 520, base station 105-b may transmit, and UE 115-c may receive, based on the PSS, a PBCH signal and an SSS in a second one or more symbol periods of the SSB.

At 525, UE 115-c may decode the PBCH signal of the SSB based on determining from the SI indication that the system information is dedicated for the first type of UE. In some cases, UE 115-c may also decode a set of control resources dedicated for the first type of UE based on the SSB and on the determining that the system information is dedicated for the first type of UE.

At 530, base station 105-b may transmit, and UE 115-c may receive, the SIB dedicated for the first type of UE. For example, the SIB may be a SIB1 carried by the PDSCH.

At 535, UE 115-c may decode the system information based at least in part on a PBCH signal in a second one or more symbol periods of the SSB based at least in part on the determining that the SSB is associated with the system information dedicated for the first type of UE. In some cases, decoding the system information is based on decoding the PBCH signal and the set of control resources.

Figure 6:
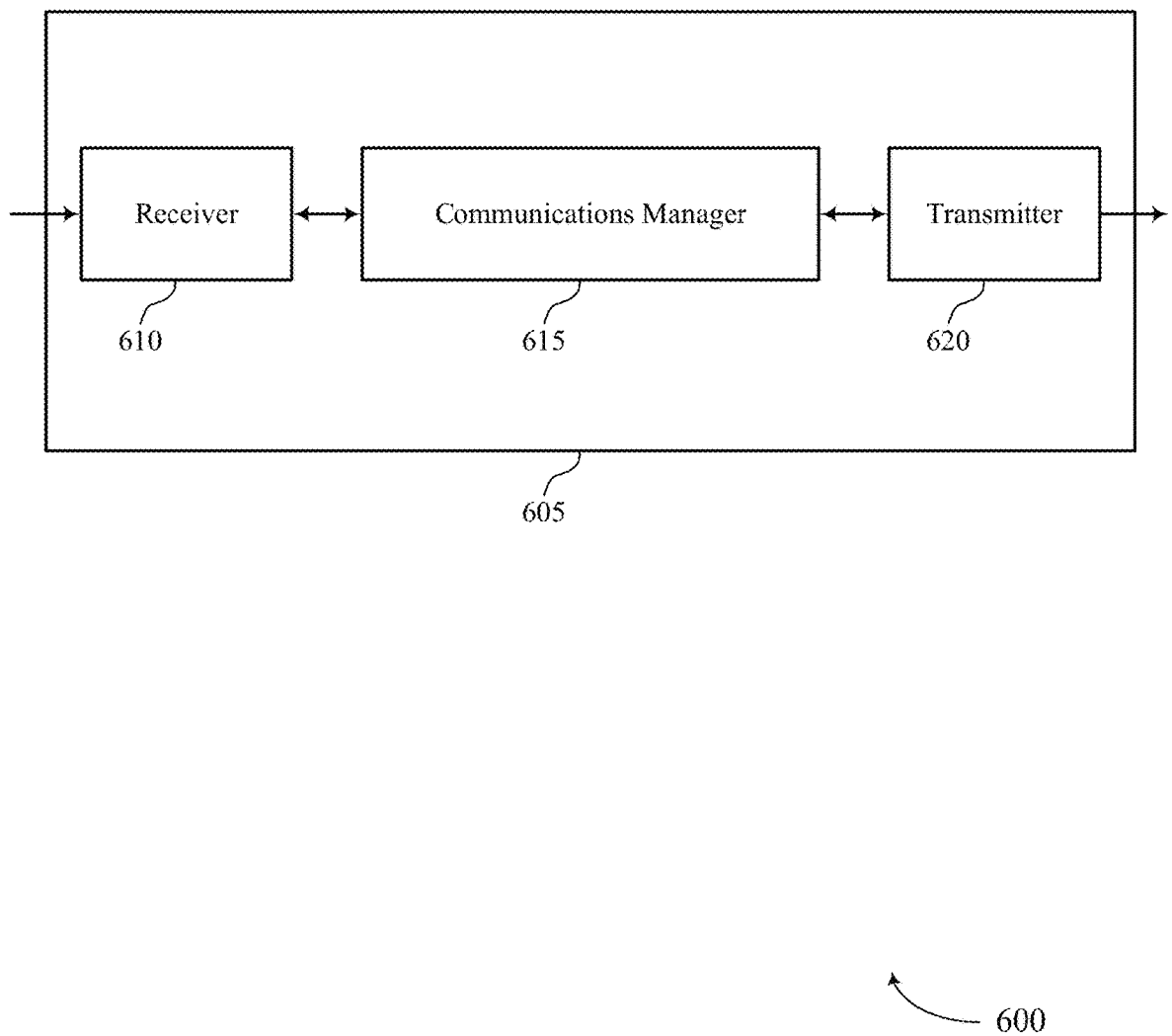
FIGS. 6 and 7 show block diagrams of devices that support early indication of new radio-light dedicated system information in accordance with aspects of the present disclosure.

FIG. 6 shows a block diagram 600 of a device 605 that supports early indication of new radio-light dedicated system information in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to early indication of new radio-light dedicated system information, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, in a first symbol period of a synchronization signal block, a primary synchronization signal on a first set of subcarriers and a system information indication on a second set of subcarriers, determine, in response to receiving the system information indication, that the synchronization signal block is associated with remaining minimum system information dedicated for the first type of UE, and decode the remaining minimum system information based on a physical broadcast channel signal in a second one or more symbol periods of the synchronization signal block based on the determining that the synchronization signal block is associated with the remaining minimum system information dedicated for the first type of UE. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
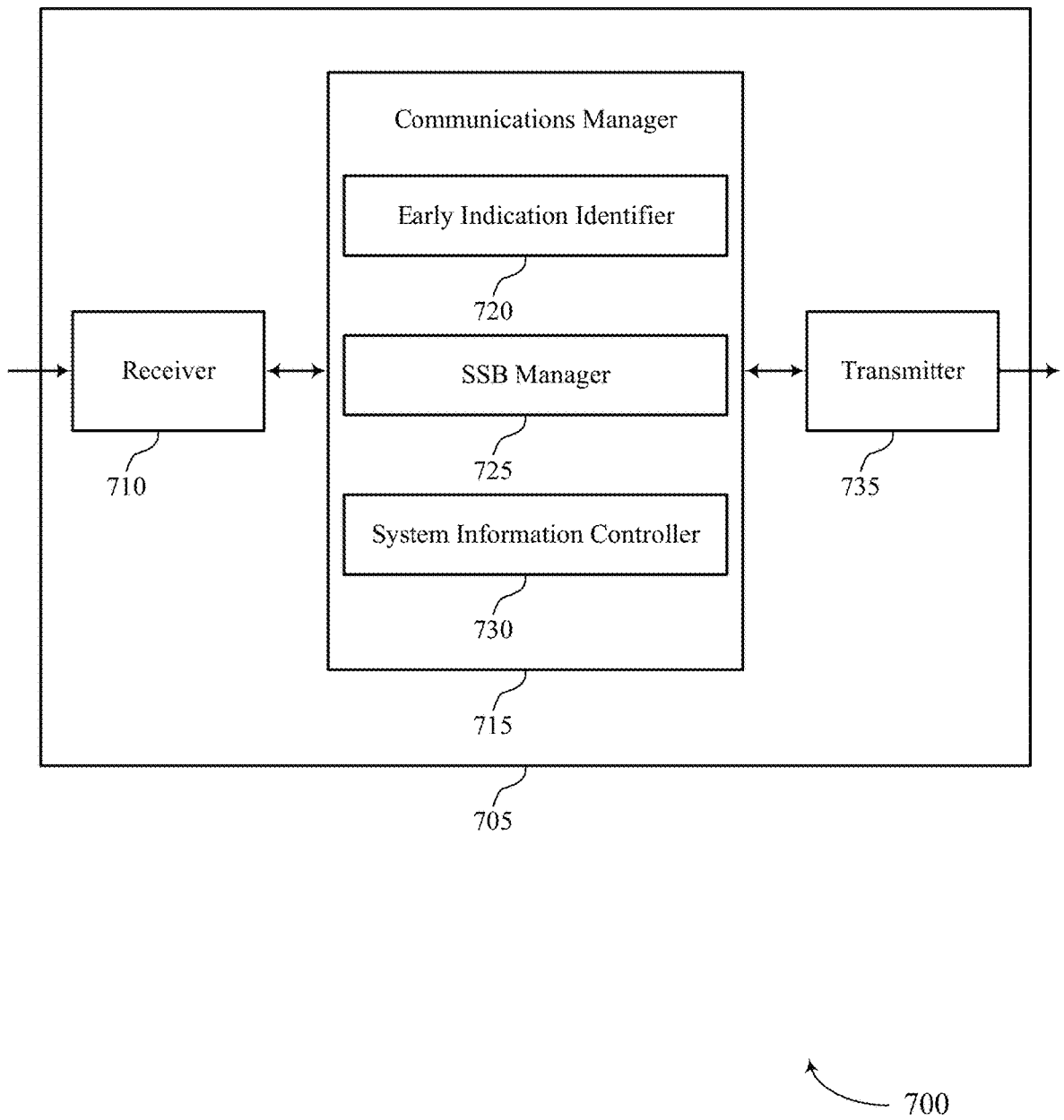

FIG. 7 shows a block diagram 700 of a device 705 that supports early indication of new radio-light dedicated system information in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to early indication of new radio-light dedicated system information, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an early indication identifier 720, an SSB manager 725, and a system information controller 730. The communications manager 715 may be an example of aspects of the communications manager 910 described herein.

The early indication identifier 720 may receive, in a first symbol period of a synchronization signal block, a primary synchronization signal on a first set of subcarriers and a system information indication on a second set of subcarriers.

The SSB manager 725 may determine, in response to receiving the system information indication, that the synchronization signal block is associated with remaining minimum system information dedicated for the first type of UE.

The system information controller 730 may decode the remaining minimum system information based on a physical broadcast channel signal in a second one or more symbol periods of the synchronization signal block based on the determining that the synchronization signal block is associated with the remaining minimum system information dedicated for the first type of UE.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
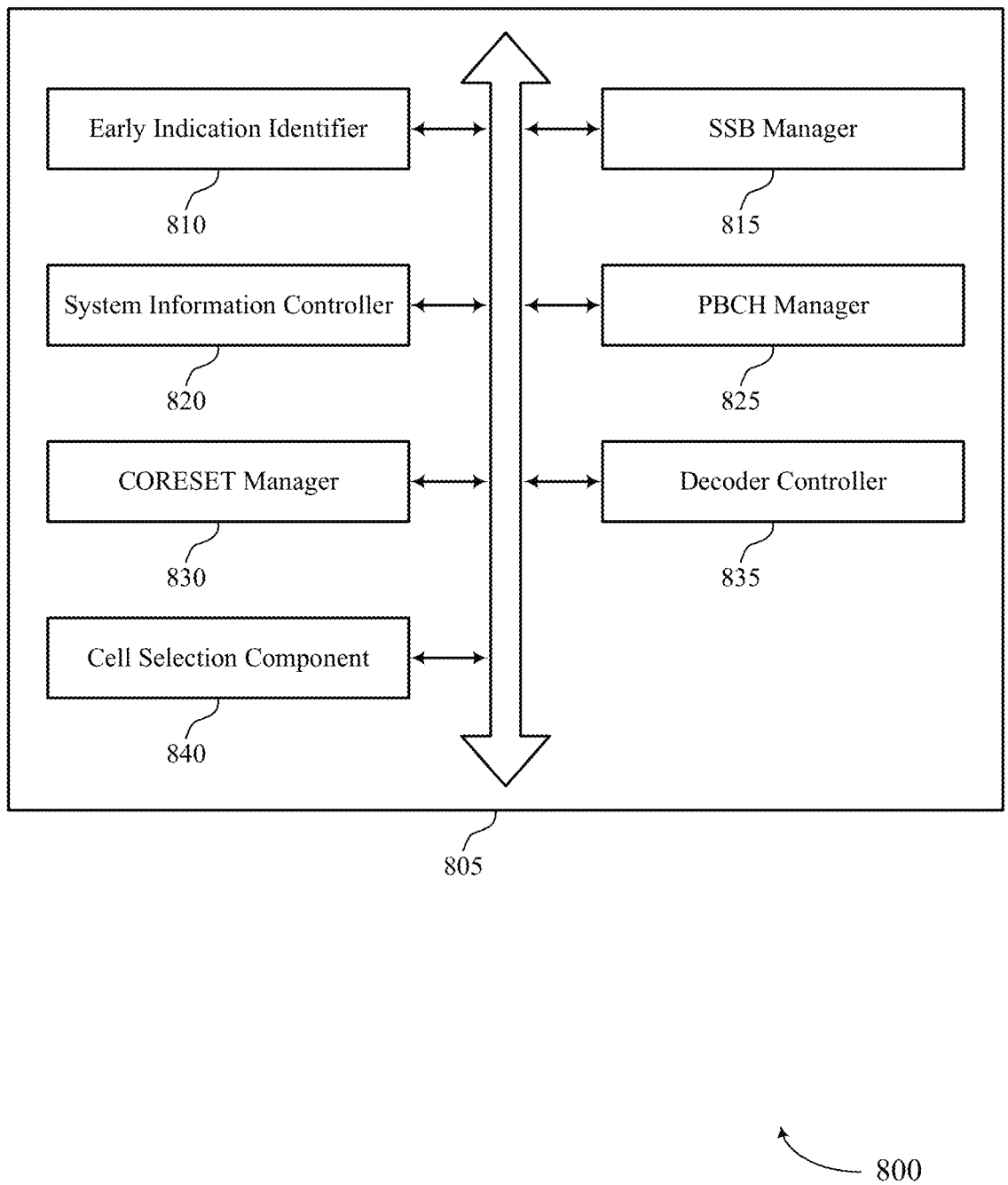
FIG. 8 shows a block diagram of a communications manager that supports early indication of new radio-light dedicated system information in accordance with aspects of the present disclosure.

FIG. 8 shows a block diagram 800 of a communications manager 805 that supports early indication of new radio-light dedicated system information in accordance with aspects of the present disclosure. The communications manager 805 may be an example of aspects of a communications manager 615, a communications manager 715, or a communications manager 910 described herein. The communications manager 805 may include an early indication identifier 810, an SSB manager 815, a system information controller 820, a PBCH manager 825, a CORESET manager 830, a decoder controller 835, and a cell selection component 840. Each of these modules may communicate, directly or indirectly, with one another (e.g., via one or more buses).

The early indication identifier 810 may receive, in a first symbol period of a synchronization signal block, a primary synchronization signal on a first set of subcarriers and a system information indication on a second set of subcarriers. In some examples, the early indication identifier 810 may determine that the remaining minimum system information is dedicated for the first type of UE based on the system information indication. In some examples, the early indication identifier 810 may determine one or more characteristics of the remaining minimum system information dedicated for the first type of UE, a control resource set dedicated for the first type of UE, or a combination thereof based on the system information indication, where the one or more characteristics include: repetition levels, a multiplexing type between the synchronization signal block and the control resource set dedicated for the first type of UE, a bandwidth category, or a combination thereof. In some examples, the bandwidth category includes a frequency range of the control resource set dedicated for the first type of UE, frequency offset of the control resource set dedicated for the first type of UE relative to the synchronization signal block, or a combination thereof.

In some examples, the early indication identifier 810 may determine that the remaining minimum system information is generic based on the system information indication. In some examples, the early indication identifier 810 may monitor, in a first symbol period of a second synchronization signal block, for the primary synchronization signal and the system information indication. In some examples, the early indication identifier 810 may detect that the system information indication is absent from the second synchronization signal block. In some examples, the early indication identifier 810 may receive one or more subcarriers at a higher frequency than the primary synchronization signal, one or more subcarriers at a lower frequency than the primary synchronization signal, or a combination thereof. In some cases, the system information indication includes one or more sequences. In some examples, the early indication identifier 810 may compare the one or more sequences to a set of stored sequences to determine that the system information indication is for the UE.

In some cases, the one or more subcarriers at the higher frequency form a first sequence of the one or more sequences, and the one or more subcarriers at the lower frequency form a second sequence of the one or more sequences. In some cases, the first sequence indicates a value of a first parameter associated with the remaining minimum system information, a control resource set dedicated for the first type of UE, or a combination thereof, and the second sequence indicates a value of a second parameter associated with the remaining minimum system information, the control resource set dedicated for the first type of UE, or a combination thereof. In some cases, the value of the first parameter or the value of the second parameter indicates a direction of a cell defining synchronization signal block dedicated for the first type of UE relative to the primary synchronization signal. In some cases, the value of the first parameter or the value of the second parameter indicates a frequency offset of a cell defining synchronization signal block dedicated for the first type of UE relative to the primary synchronization signal. In some cases, the first sequence and the second sequence indicate a same value for a parameter associated with the remaining minimum system information, a control resource set dedicated for the first type of UE, or a combination thereof. In some cases, the one or more subcarriers at the higher frequency and the one or more subcarriers at the lower frequency form a joint sequence. In some cases, the one or more sequences include a multi-stage structure.

The SSB manager 815 may determine, in response to receiving the system information indication, that the synchronization signal block is associated with remaining minimum system information dedicated for the first type of UE.

The system information controller 820 may decode the remaining minimum system information based on a physical broadcast channel signal in a second one or more symbol periods of the synchronization signal block based on the determining that the synchronization signal block is associated with the remaining minimum system information dedicated for the first type of UE. In some cases, the first type of UE is a type of low tier UE. In some cases, the first type of UE is a generic UE.

The PBCH manager 825 may decode a physical broadcast channel signal of the synchronization signal block based on determining the remaining minimum system information is dedicated for the first type of UE.

The CORESET manager 830 may decode a control resource set dedicated for the first type of UE based on the synchronization signal block and on the determining that the remaining minimum system information is dedicated for the first type of UE, where the control resource set dedicated for the first type of UE schedules a downlink shared channel that carries the remaining minimum system information, and where decoding the remaining minimum system information is further based on decoding the physical broadcast channel signal and the control resource set dedicated for the first type of UE. In some cases, the control resource set dedicated for the first type of UE includes a type-0 control resource set (CORESET0).

The decoder controller 835 may terminate decoding of the synchronization signal block before the physical broadcast channel signal of the synchronization signal block is decoded based on determining the remaining minimum system information is generic. In some examples, the decoder controller 835 may terminate, based on detecting that the system information indication is absent, decoding of the second synchronization signal block before a physical broadcast channel signal of the second synchronization signal block is decoded by the UE.

The cell selection component 840 may identify that the synchronization signal block is a cell defining synchronization signal block dedicated for the first type of UE based on the system information indication indicating that the synchronization signal block is associated with the remaining minimum system information dedicated for the first type of UE. In some examples, the cell selection component 840 may perform cell selection or reselection associated with the first type of UE based on the cell defining synchronization signal block being dedicated for the first type of UE. In some cases, the cell defining synchronization signal block dedicated for the first type of UE includes a same identifier as a generic cell defining synchronization signal block.

Figure 9:
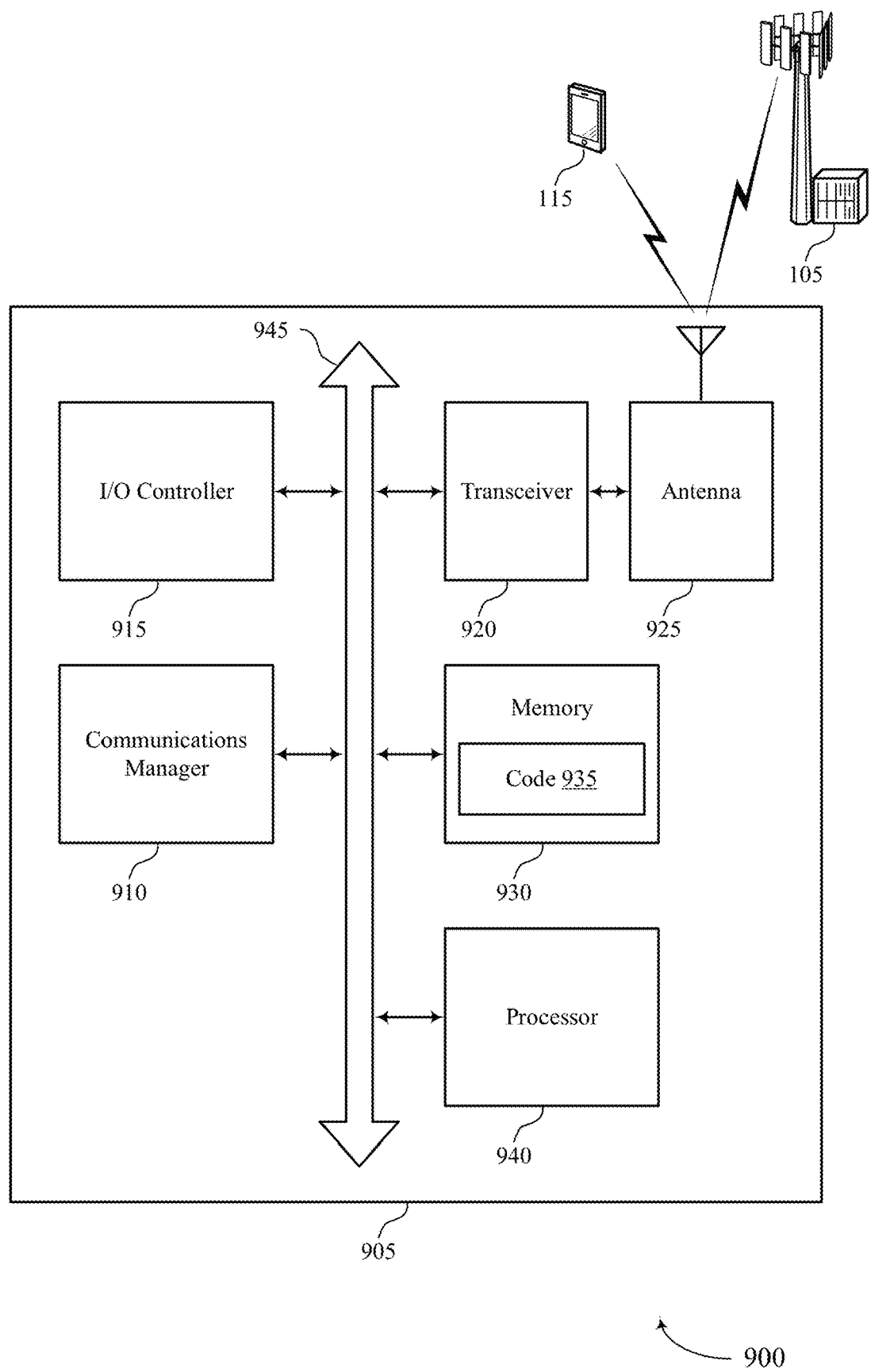
FIG. 9 shows a diagram of a system including a device that supports early indication of new radio-light dedicated system information in accordance with aspects of the present disclosure.

FIG. 9 shows a diagram of a system 900 including a device 905 that supports early indication of new radio-light dedicated system information in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, in a first symbol period of a synchronization signal block, a primary synchronization signal on a first set of subcarriers and a system information indication on a second set of subcarriers, determine, in response to receiving the system information indication, that the synchronization signal block is associated with remaining minimum system information dedicated for the first type of UE, and decode the remaining minimum system information based on a physical broadcast channel signal in a second one or more symbol periods of the synchronization signal block based on the determining that the synchronization signal block is associated with the remaining minimum system information dedicated for the first type of UE.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting early indication of new radio-light dedicated system information).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
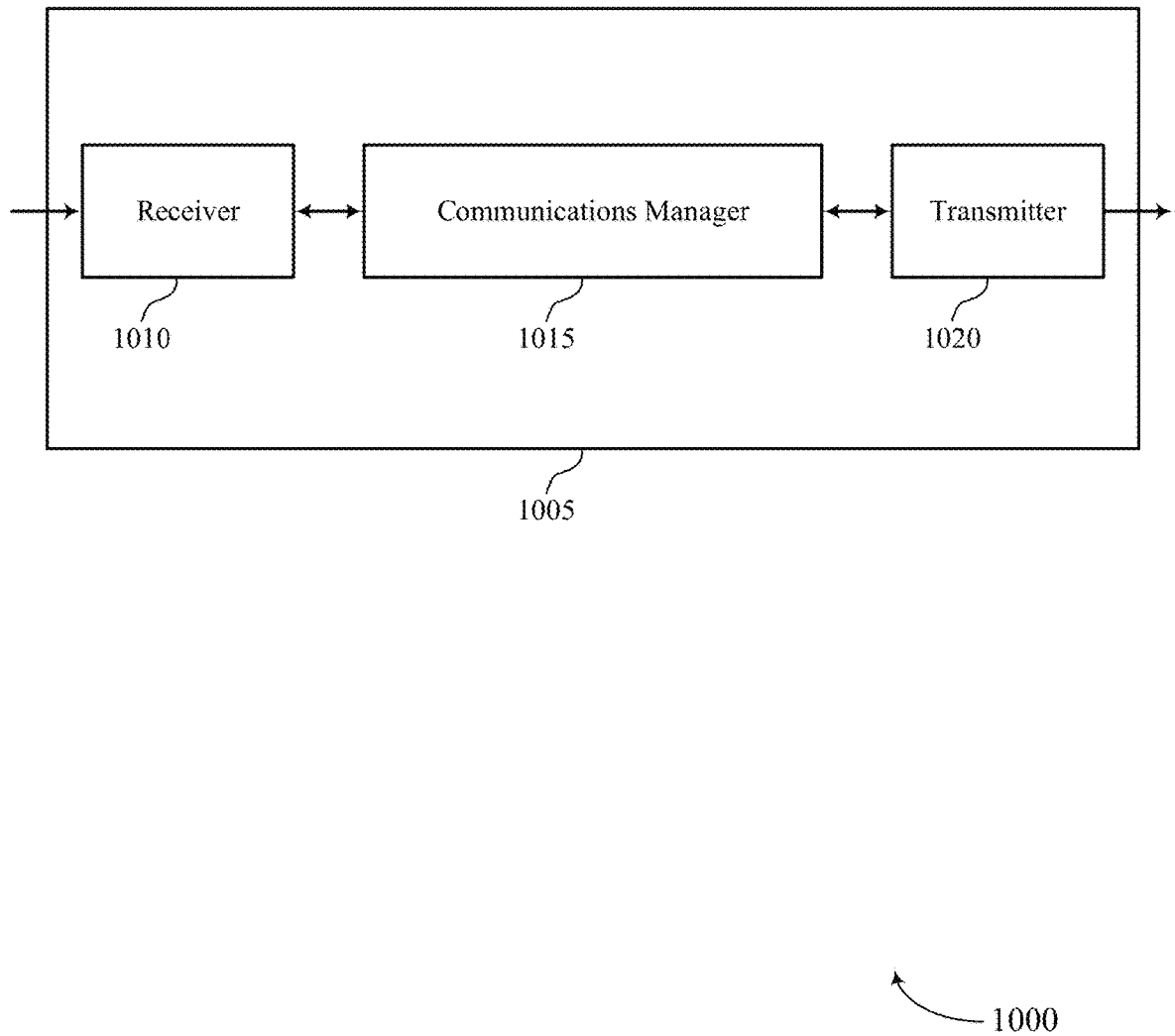
FIGS. 10 and 11 show block diagrams of devices that support early indication of new radio-light dedicated system information in accordance with aspects of the present disclosure.

FIG. 10 shows a block diagram 1000 of a device 1005 that supports early indication of new radio-light dedicated system information in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to early indication of new radio-light dedicated system information, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may generate a system information indication for a synchronization signal block that indicates that the synchronization signal block is associated with remaining minimum system information for a first type of UE, transmit, in a first symbol period of the synchronization signal block, a primary synchronization signal on a first set of subcarriers and the system information indication on a second set of subcarriers, and transmit, based on transmitting the system information indication, the remaining minimum system information dedicated for the first type of UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
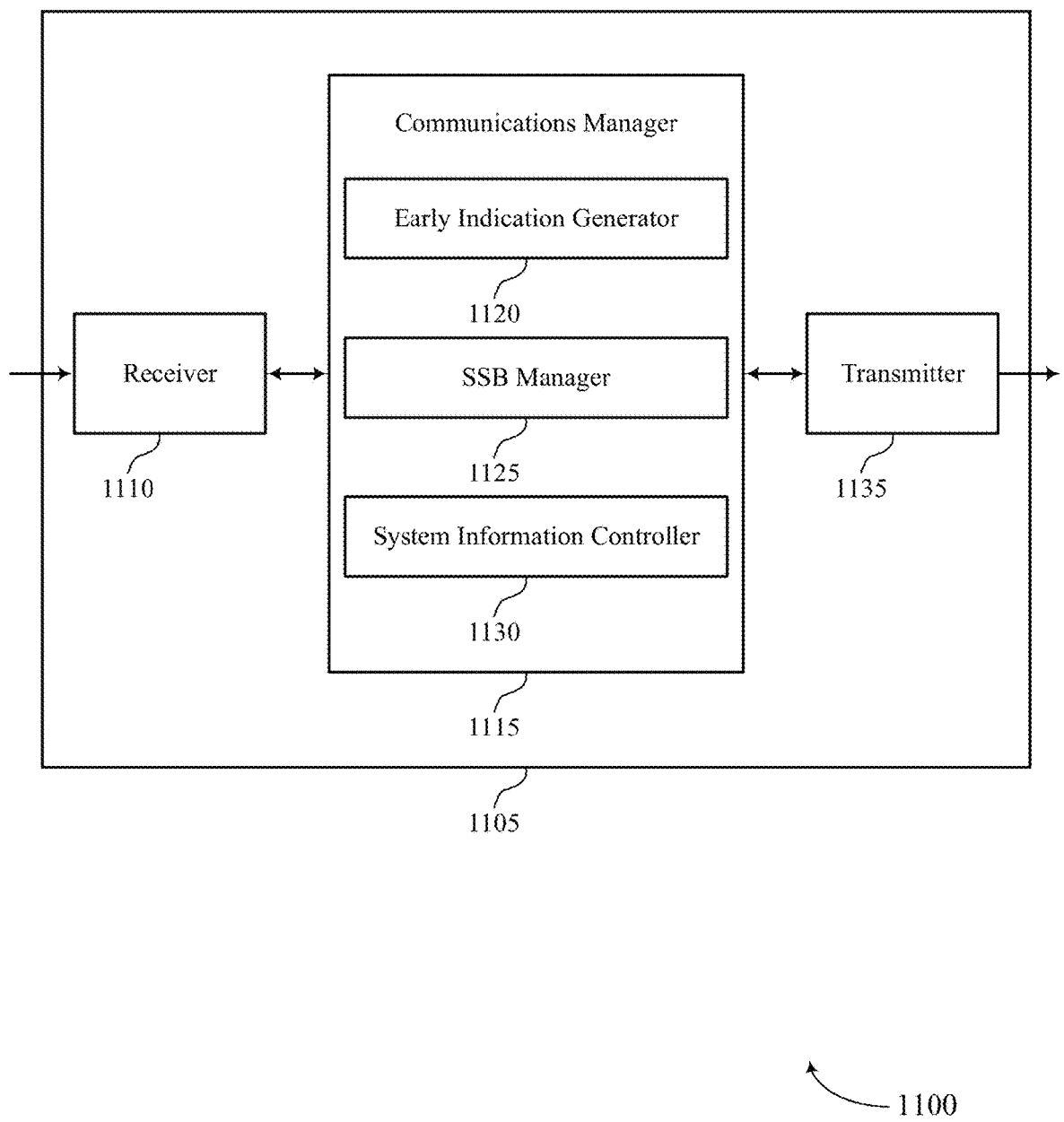

FIG. 11 shows a block diagram 1100 of a device 1105 that supports early indication of new radio-light dedicated system information in accordance with aspects of the present disclosure. The device 1105 may be an example of aspects of a device 1005, or a base station 105 as described herein.

The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to early indication of new radio-light dedicated system information, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an early indication generator 1120, an SSB manager 1125, and a system information controller 1130. The communications manager 1115 may be an example of aspects of the communications manager 1310 described herein.

The early indication generator 1120 may generate a system information indication for a synchronization signal block that indicates that the synchronization signal block is associated with remaining minimum system information for a first type of UE.

The SSB manager 1125 may transmit, in a first symbol period of the synchronization signal block, a primary synchronization signal on a first set of subcarriers and the system information indication on a second set of subcarriers.

The system information controller 1130 may transmit, based on transmitting the system information indication, the remaining minimum system information dedicated for the first type of UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
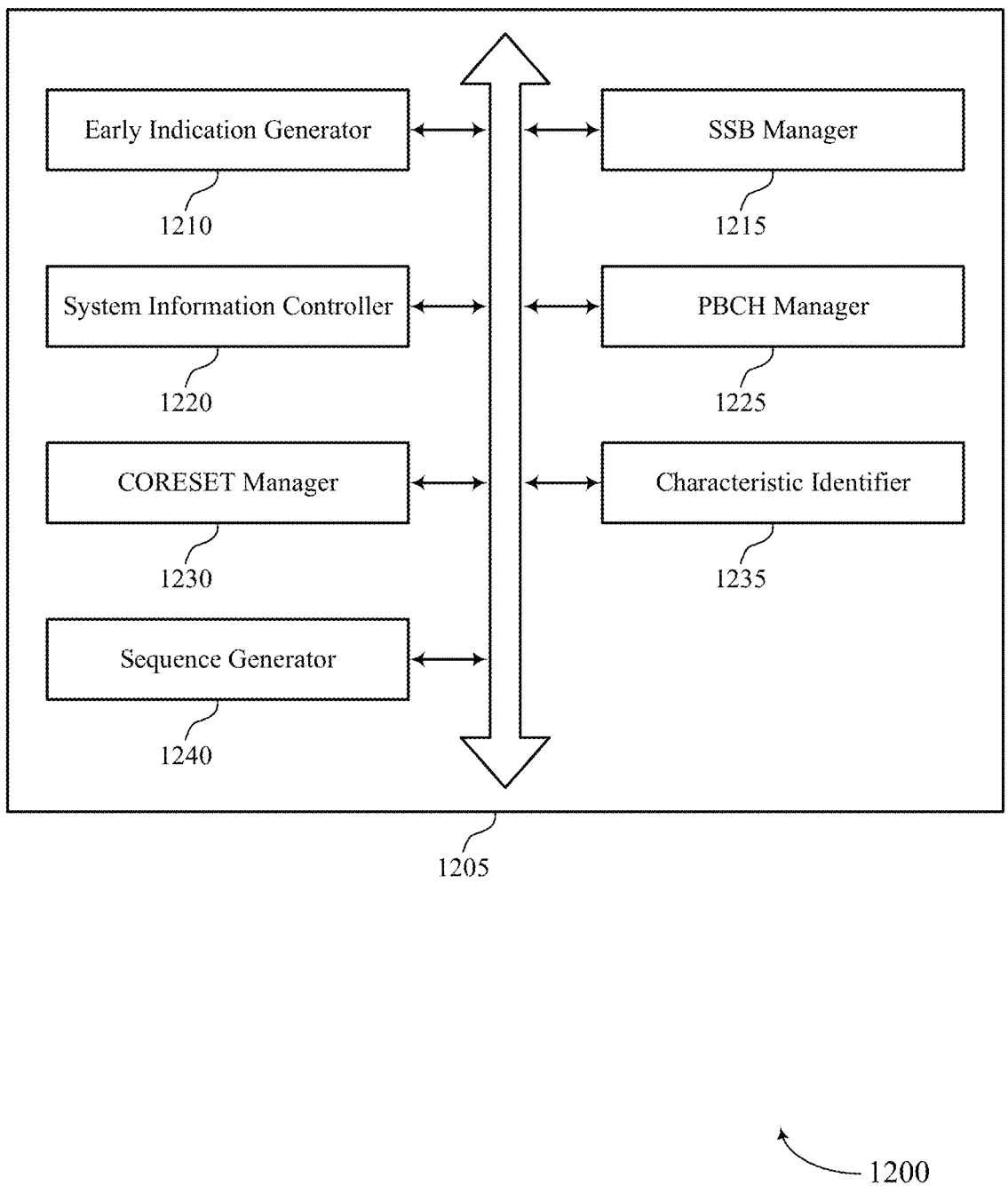
FIG. 12 shows a block diagram of a communications manager that supports early indication of new radio-light dedicated system information in accordance with aspects of the present disclosure.

FIG. 12 shows a block diagram 1200 of a communications manager 1205 that supports early indication of new radio-light dedicated system information in accordance with aspects of the present disclosure. The communications manager 1205 may be an example of aspects of a communications manager 1015, a communications manager 1115, or a communications manager 1310 described herein. The communications manager 1205 may include an early indication generator 1210, an SSB manager 1215, a system information controller 1220, a PBCH manager 1225, a CORESET manager 1230, a characteristic identifier 1235, and a sequence generator 1240. Each of these modules may communicate, directly or indirectly, with one another (e.g., via one or more buses).

The early indication generator 1210 may generate a system information indication for a synchronization signal block that indicates that the synchronization signal block is associated with remaining minimum system information for a first type of UE. In some cases, the system information indication includes one or more sequences.

The SSB manager 1215 may transmit, in a first symbol period of the synchronization signal block, a primary synchronization signal on a first set of subcarriers and the system information indication on a second set of subcarriers. In some examples, the SSB manager 1215 may transmit the system information indication indicates that the remaining minimum system information is generic. In some examples, the SSB manager 1215 may transmit the system information indication in one or more subcarriers at a higher frequency than the primary synchronization signal, one or more subcarriers at a lower frequency than the primary synchronization signal, or a combination thereof. In some cases, the synchronization signal block is a cell defining synchronization signal block dedicated for the first type of UE based on the system information indication indicating that the synchronization signal block is associated with the remaining minimum system information dedicated for the first type of UE. In some cases, the cell defining synchronization signal block dedicated for the first type of UE includes a same identifier as a generic cell defining synchronization signal block.

The system information controller 1220 may transmit, based on transmitting the system information indication, the remaining minimum system information dedicated for the first type of UE. In some cases, the first type of UE is a type of low tier UE. In some cases, the first type of UE is a generic UE.

The PBCH manager 1225 may transmit, based on transmitting the primary synchronization signal, a physical broadcast channel signal in a second one or more symbol periods of the synchronization signal block.

The CORESET manager 1230 may transmit, based on transmitting the physical broadcast channel signal, a control resource set dedicated for the first type of UE, where the control resource set dedicated for the first type of UE schedules a downlink shared channel that carries the remaining minimum system information, and where transmitting the system information indication indicates that the remaining minimum system information is dedicated for the first type of UE. In some cases, the control resource set dedicated for the first type of UE includes a type-0 control resource set (CORESET0).

The characteristic identifier 1235 may identify one or more characteristics of the remaining minimum system information, a control resource set dedicated for the first type of UE, or a combination thereof in the system information indication, where the or more characteristics include: repetition levels, a multiplexing type between the synchronization signal block and the control resource set dedicated for the first type of UE, a bandwidth category, or a combination thereof. In some cases, the bandwidth category includes a frequency range of the control resource set dedicated for the first type of UE, frequency offset of the control resource set dedicated for the first type of UE relative to the synchronization signal block, or a combination thereof.

The sequence generator 1240 may generate a first sequence of the one or more sequences for the one or more subcarriers at the higher frequency. In some examples, the sequence generator 1240 may generate a second sequence of the one or more sequences for the one or more subcarriers at the lower frequency.

In some cases, the first sequence indicates a value of a first parameter associated with the remaining minimum system information, a control resource set dedicated for the first type of UE, or a combination thereof, and the second sequence indicates a value of a second parameter associated with the remaining minimum system information, the control resource set dedicated for the first type of UE, or a combination thereof. In some cases, the value of the first parameter or the value of the second parameter indicates a direction of a cell defining synchronization signal block dedicated for the first type of UE relative to the primary synchronization signal. In some cases, the value of the first parameter or the value of the second parameter indicates a frequency offset of a cell defining synchronization signal block dedicated for the first type of UE relative to the primary synchronization signal. In some cases, the first sequence and the second sequence indicate a same value for a parameter associated with the remaining minimum system information, a control resource set dedicated for the first type of UE, or a combination thereof. In some cases, the one or more subcarriers at the higher frequency and the one or more subcarriers at the lower frequency form a joint sequence. In some cases, the one or more sequences include a multi-stage structure.

Figure 13:
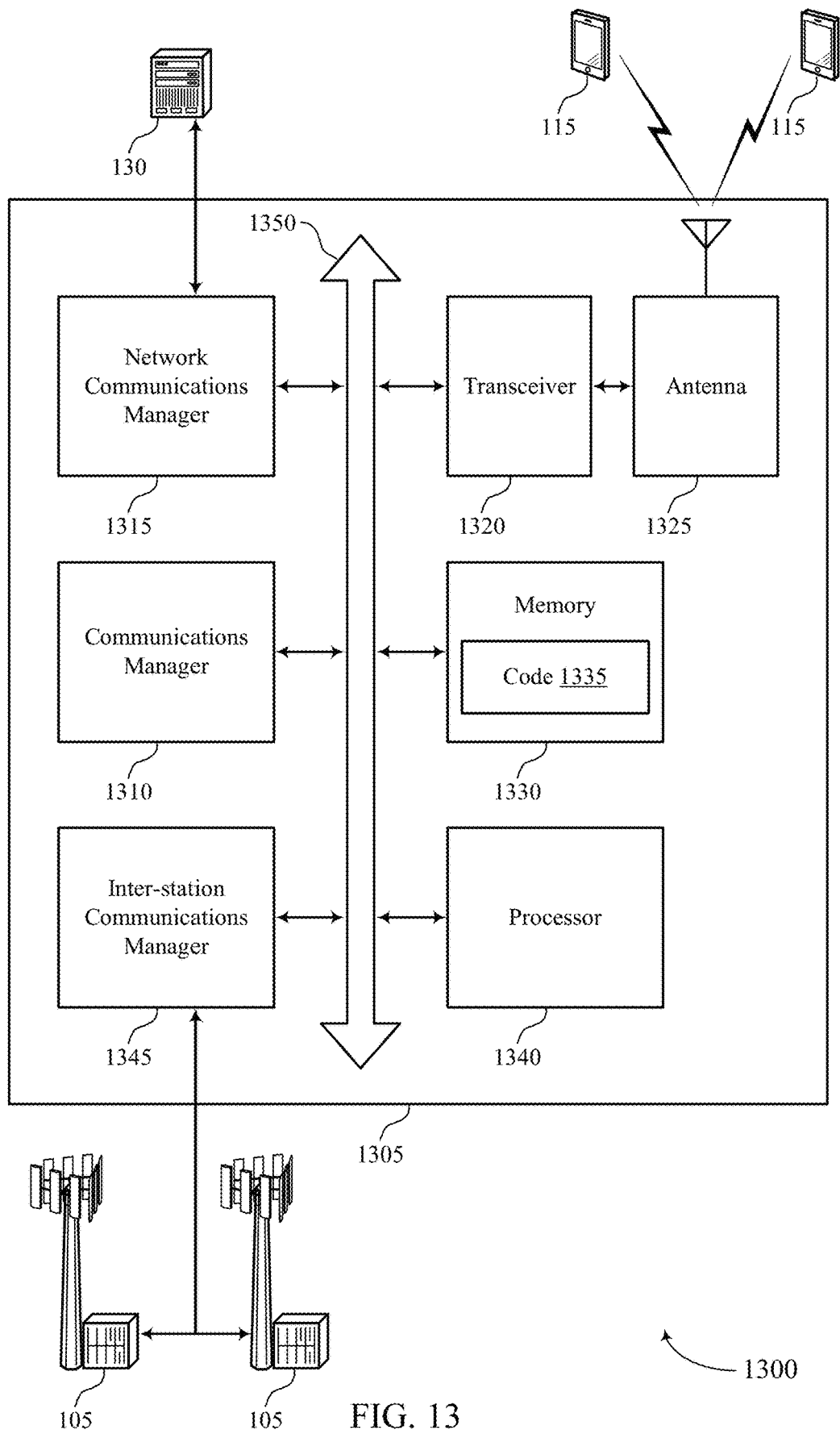
FIG. 13 shows a diagram of a system including a device that supports early indication of new radio-light dedicated system information in accordance with aspects of the present disclosure.

FIG. 13 shows a diagram of a system 1300 including a device 1305 that supports early indication of new radio-light dedicated system information in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may generate a system information indication for a synchronization signal block that indicates that the synchronization signal block is associated with remaining minimum system information for a first type of UE, transmit, in a first symbol period of the synchronization signal block, a primary synchronization signal on a first set of subcarriers and the system information indication on a second set of subcarriers, and transmit, based on transmitting the system information indication, the remaining minimum system information dedicated for the first type of UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting early indication of new radio-light dedicated system information).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
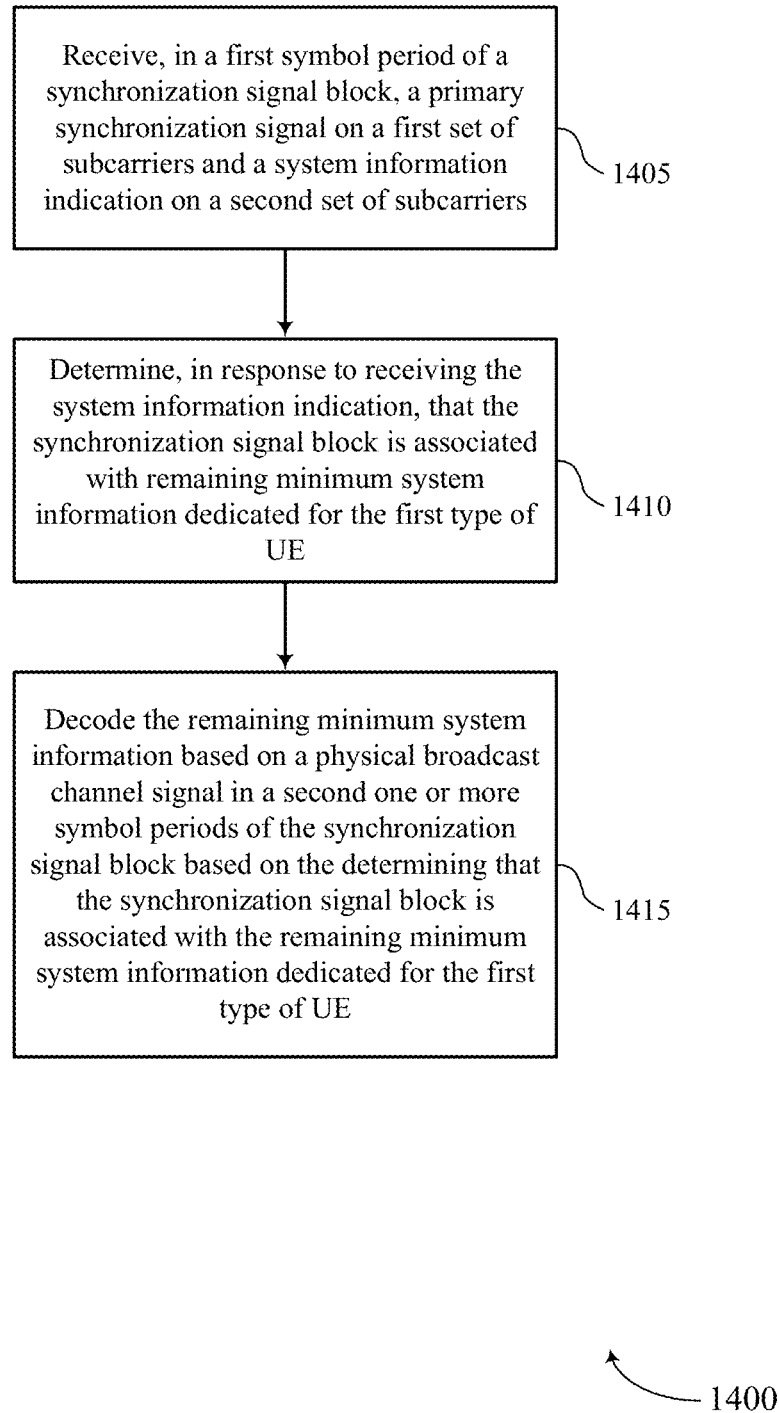
FIGS. 14 through 22 show flowcharts illustrating methods that support early indication of new radio-light dedicated system information in accordance with aspects of the present disclosure.

FIG. 14 shows a flowchart illustrating a method 1400 that supports early indication of new radio-light dedicated system information in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, in a first symbol period of a synchronization signal block, a primary synchronization signal on a first set of subcarriers and a system information indication on a second set of subcarriers. The operations of 1405 may be performed according to the methods described herein. In some examples, aspects of the operations of 1405 may be performed by an early indication identifier as described with reference to FIGS. 6 through 9.

At 1410, the UE may determine, in response to receiving the system information indication, that the synchronization signal block is associated with remaining minimum system information dedicated for the first type of UE. The operations of 1410 may be performed according to the methods described herein. In some examples, aspects of the operations of 1410 may be performed by an SSB manager as described with reference to FIGS. 6 through 9.

At 1415, the UE may decode the remaining minimum system information based on a physical broadcast channel signal in a second one or more symbol periods of the synchronization signal block based on the determining that the synchronization signal block is associated with the remaining minimum system information dedicated for the first type of UE. The operations of 1415 may be performed according to the methods described herein. In some examples, aspects of the operations of 1415 may be performed by a system information controller as described with reference to FIGS. 6 through 9.

Figure 15:
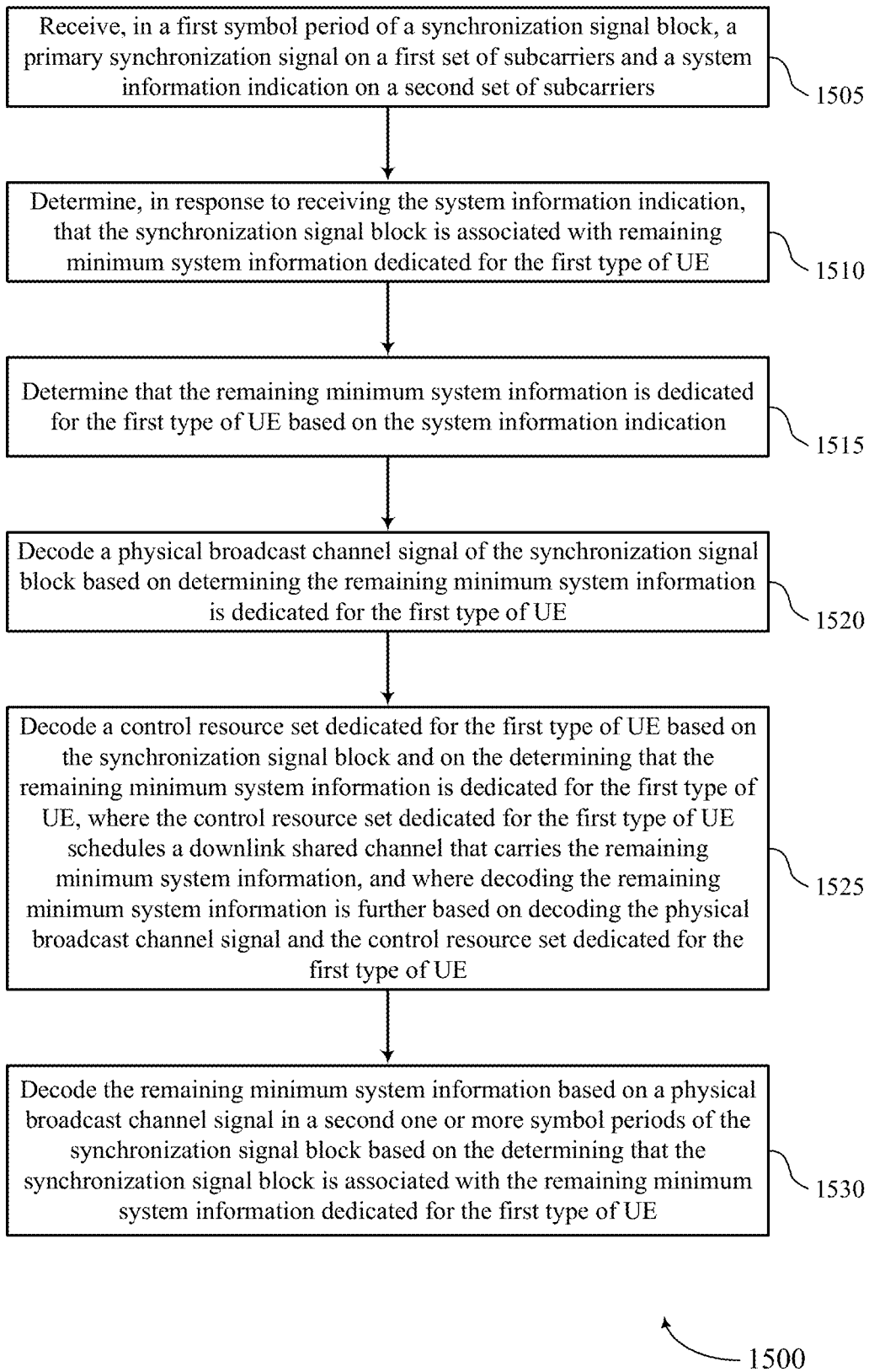

FIG. 15 shows a flowchart illustrating a method 1500 that supports early indication of new radio-light dedicated system information in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, in a first symbol period of a synchronization signal block, a primary synchronization signal on a first set of subcarriers and a system information indication on a second set of subcarriers. The operations of 1505 may be performed according to the methods described herein. In some examples, aspects of the operations of 1505 may be performed by an early indication identifier as described with reference to FIGS. 6 through 9.

At 1510, the UE may determine, in response to receiving the system information indication, that the synchronization signal block is associated with remaining minimum system information dedicated for the first type of UE. The operations of 1510 may be performed according to the methods described herein. In some examples, aspects of the operations of 1510 may be performed by an SSB manager as described with reference to FIGS. 6 through 9.

At 1515, the UE may determine that the remaining minimum system information is dedicated for the first type of UE based on the system information indication. The operations of 1515 may be performed according to the methods described herein. In some examples, aspects of the operations of 1515 may be performed by an early indication identifier as described with reference to FIGS. 6 through 9.

At 1520, the UE may decode a physical broadcast channel signal of the synchronization signal block based on determining the remaining minimum system information is dedicated for the first type of UE. The operations of 1520 may be performed according to the methods described herein. In some examples, aspects of the operations of 1520 may be performed by a PBCH manager as described with reference to FIGS. 6 through 9.

At 1525, the UE may decode a control resource set dedicated for the first type of UE based on the synchronization signal block and on the determining that the remaining minimum system information is dedicated for the first type of UE, where the control resource set dedicated for the first type of UE schedules a downlink shared channel that carries the remaining minimum system information, and where decoding the remaining minimum system information is further based on decoding the physical broadcast channel signal and the control resource set dedicated for the first type of UE. The operations of 1525 may be performed according to the methods described herein. In some examples, aspects of the operations of 1525 may be performed by a CORESET manager as described with reference to FIGS. 6 through 9.

At 1530, the UE may decode the remaining minimum system information based on a physical broadcast channel signal in a second one or more symbol periods of the synchronization signal block based on the determining that the synchronization signal block is associated with the remaining minimum system information dedicated for the first type of UE. The operations of 1530 may be performed according to the methods described herein. In some examples, aspects of the operations of 1530 may be performed by a system information controller as described with reference to FIGS. 6 through 9.

Figure 16:
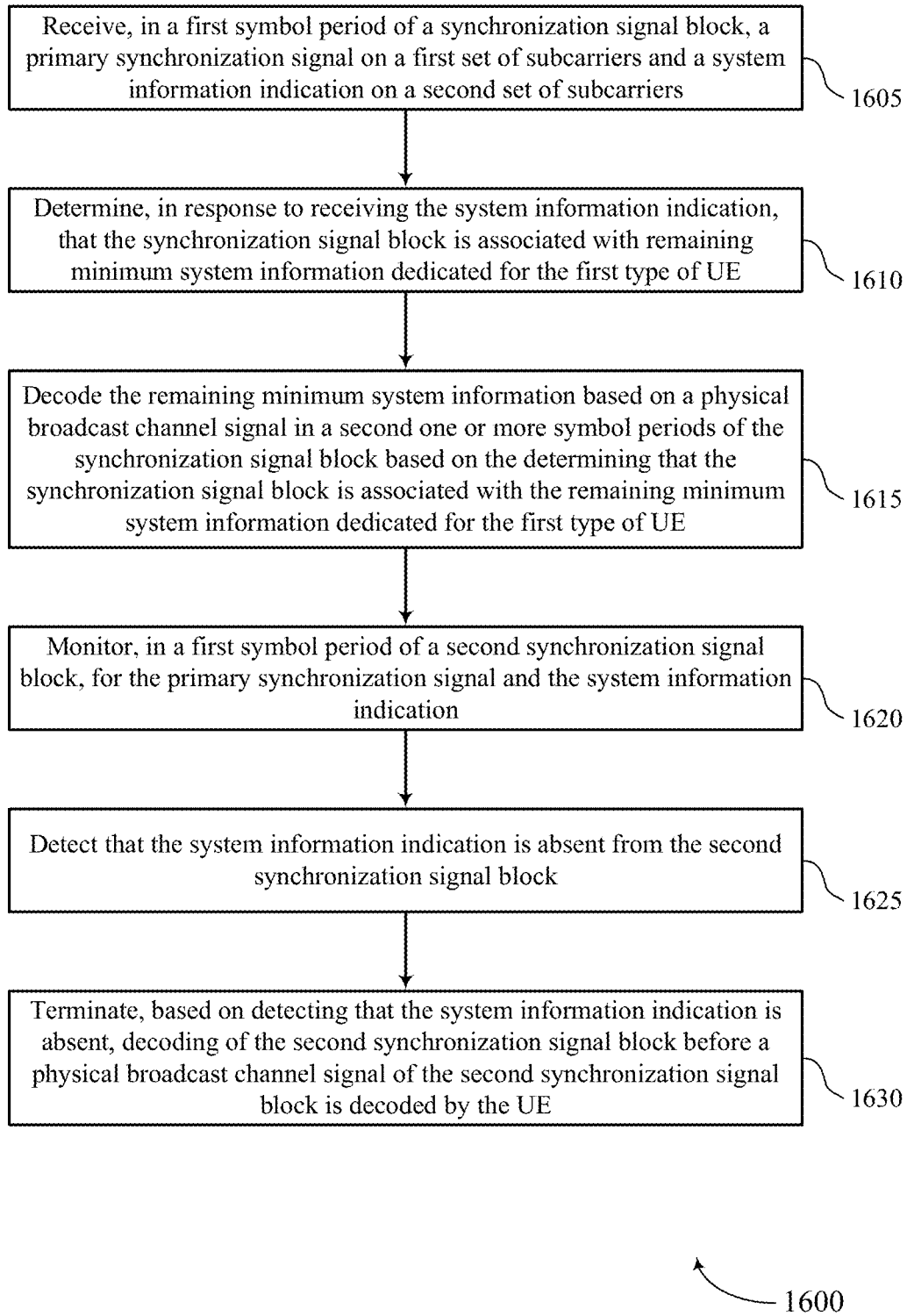

FIG. 16 shows a flowchart illustrating a method 1600 that supports early indication of new radio-light dedicated system information in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, in a first symbol period of a synchronization signal block, a primary synchronization signal on a first set of subcarriers and a system information indication on a second set of subcarriers. The operations of 1605 may be performed according to the methods described herein. In some examples, aspects of the operations of 1605 may be performed by an early indication identifier as described with reference to FIGS. 6 through 9.

At 1610, the UE may determine, in response to receiving the system information indication, that the synchronization signal block is associated with remaining minimum system information dedicated for the first type of UE. The operations of 1610 may be performed according to the methods described herein. In some examples, aspects of the operations of 1610 may be performed by an SSB manager as described with reference to FIGS. 6 through 9.

At 1615, the UE may decode the remaining minimum system information based on a physical broadcast channel signal in a second one or more symbol periods of the synchronization signal block based on the determining that the synchronization signal block is associated with the remaining minimum system information dedicated for the first type of UE. The operations of 1615 may be performed according to the methods described herein. In some examples, aspects of the operations of 1615 may be performed by a system information controller as described with reference to FIGS. 6 through 9.

At 1620, the UE may monitor, in a first symbol period of a second synchronization signal block, for the primary synchronization signal and the system information indication. The operations of 1620 may be performed according to the methods described herein. In some examples, aspects of the operations of 1620 may be performed by an early indication identifier as described with reference to FIGS. 6 through 9.

At 1625, the UE may detect that the system information indication is absent from the second synchronization signal block. The operations of 1625 may be performed according to the methods described herein. In some examples, aspects of the operations of 1625 may be performed by an early indication identifier as described with reference to FIGS. 6 through 9.

At 1630, the UE may terminate, based on detecting that the system information indication is absent, decoding of the second synchronization signal block before a physical broadcast channel signal of the second synchronization signal block is decoded by the UE. The operations of 1630 may be performed according to the methods described herein. In some examples, aspects of the operations of 1630 may be performed by a decoder controller as described with reference to FIGS. 6 through 9.

Figure 17:
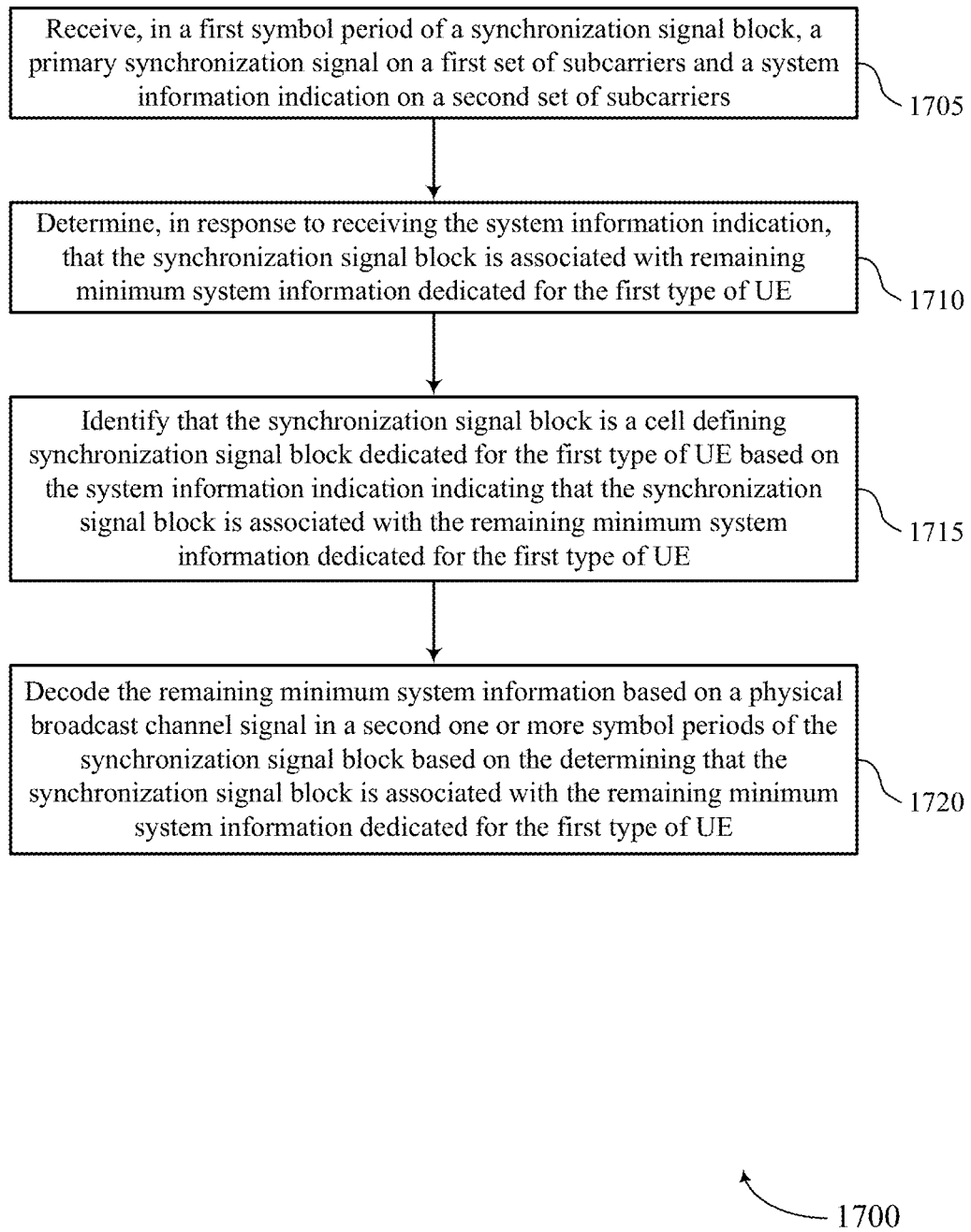

FIG. 17 shows a flowchart illustrating a method 1700 that supports early indication of new radio-light dedicated system information in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, in a first symbol period of a synchronization signal block, a primary synchronization signal on a first set of subcarriers and a system information indication on a second set of subcarriers. The operations of 1705 may be performed according to the methods described herein. In some examples, aspects of the operations of 1705 may be performed by an early indication identifier as described with reference to FIGS. 6 through 9.

At 1710, the UE may determine, in response to receiving the system information indication, that the synchronization signal block is associated with remaining minimum system information dedicated for the first type of UE. The operations of 1710 may be performed according to the methods described herein. In some examples, aspects of the operations of 1710 may be performed by an SSB manager as described with reference to FIGS. 6 through 9.

At 1715, the UE may identify that the synchronization signal block is a cell defining synchronization signal block dedicated for the first type of UE based on the system information indication indicating that the synchronization signal block is associated with the remaining minimum system information dedicated for the first type of UE. The operations of 1715 may be performed according to the methods described herein. In some examples, aspects of the operations of 1715 may be performed by a cell selection component as described with reference to FIGS. 6 through 9.

At 1720, the UE may decode the remaining minimum system information based on a physical broadcast channel signal in a second one or more symbol periods of the synchronization signal block based on the determining that the synchronization signal block is associated with the remaining minimum system information dedicated for the first type of UE. The operations of 1720 may be performed according to the methods described herein. In some examples, aspects of the operations of 1720 may be performed by a system information controller as described with reference to FIGS. 6 through 9.

Figure 18:
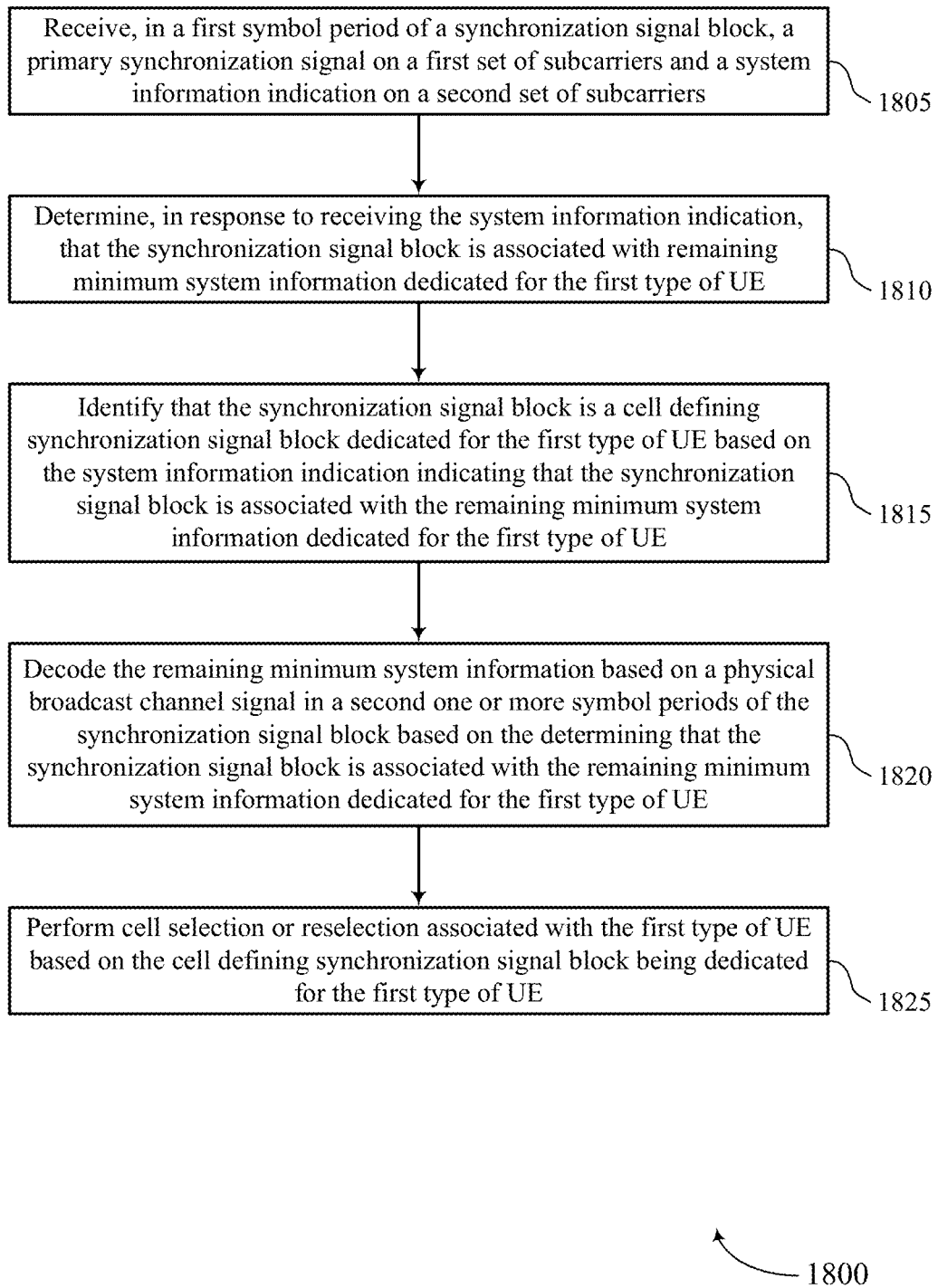

FIG. 18 shows a flowchart illustrating a method 1800 that supports early indication of new radio-light dedicated system information in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive, in a first symbol period of a synchronization signal block, a primary synchronization signal on a first set of subcarriers and a system information indication on a second set of subcarriers. The operations of 1805 may be performed according to the methods described herein. In some examples, aspects of the operations of 1805 may be performed by an early indication identifier as described with reference to FIGS. 6 through 9.

At 1810, the UE may determine, in response to receiving the system information indication, that the synchronization signal block is associated with remaining minimum system information dedicated for the first type of UE. The operations of 1810 may be performed according to the methods described herein. In some examples, aspects of the operations of 1810 may be performed by an SSB manager as described with reference to FIGS. 6 through 9.

At 1815, the UE may identify that the synchronization signal block is a cell defining synchronization signal block dedicated for the first type of UE based on the system information indication indicating that the synchronization signal block is associated with the remaining minimum system information dedicated for the first type of UE. The operations of 1815 may be performed according to the methods described herein. In some examples, aspects of the operations of 1815 may be performed by a cell selection component as described with reference to FIGS. 6 through 9.

At 1820, the UE may decode the remaining minimum system information based on a physical broadcast channel signal in a second one or more symbol periods of the synchronization signal block based on the determining that the synchronization signal block is associated with the remaining minimum system information dedicated for the first type of UE. The operations of 1820 may be performed according to the methods described herein. In some examples, aspects of the operations of 1820 may be performed by a system information controller as described with reference to FIGS. 6 through 9.

At 1825, the UE may perform cell selection or reselection associated with the first type of UE based on the cell defining synchronization signal block being dedicated for the first type of UE. The operations of 1825 may be performed according to the methods described herein. In some examples, aspects of the operations of 1825 may be performed by a cell selection component as described with reference to FIGS. 6 through 9.

Figure 19:
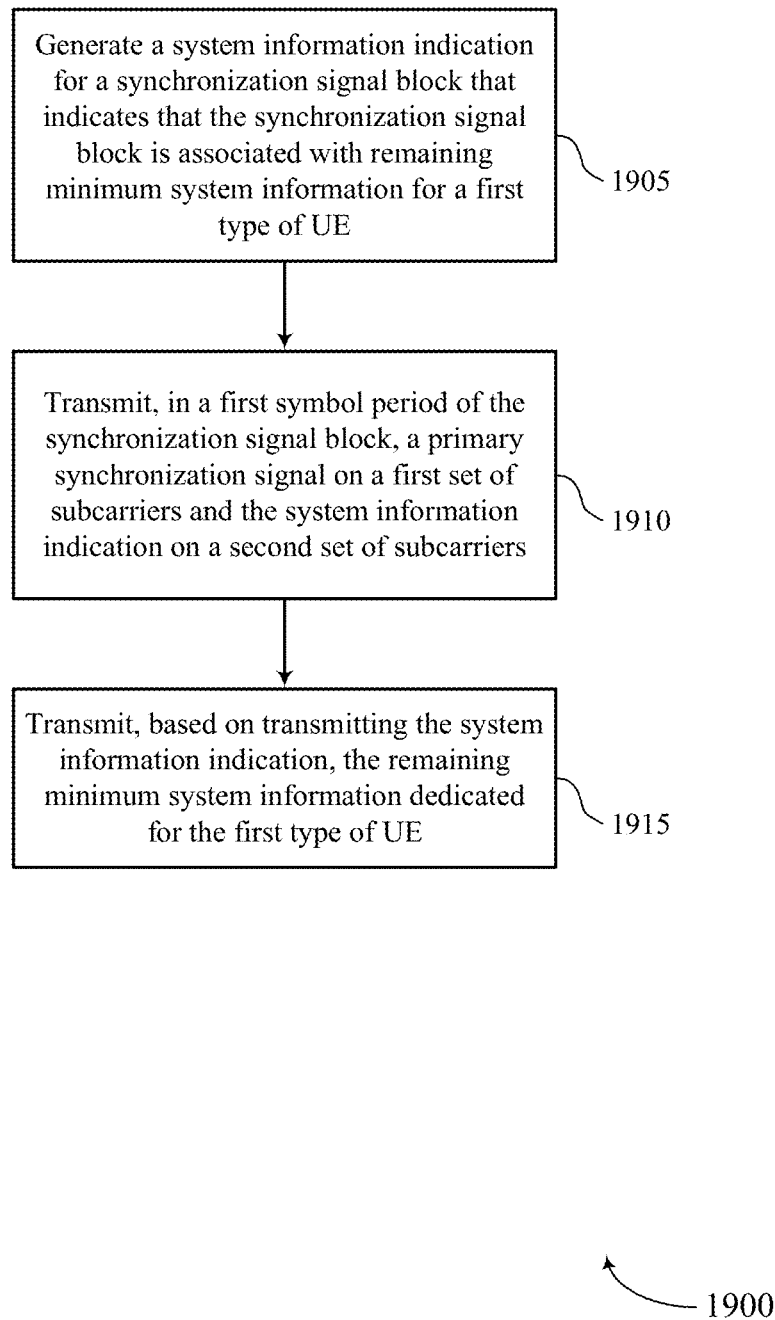

FIG. 19 shows a flowchart illustrating a method 1900 that supports early indication of new radio-light dedicated system information in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may generate a system information indication for a synchronization signal block that indicates that the synchronization signal block is associated with remaining minimum system information for a first type of UE. The operations of 1905 may be performed according to the methods described herein. In some examples, aspects of the operations of 1905 may be performed by an early indication generator as described with reference to FIGS. 10 through 13.

At 1910, the base station may transmit, in a first symbol period of the synchronization signal block, a primary synchronization signal on a first set of subcarriers and the system information indication on a second set of subcarriers. The operations of 1910 may be performed according to the methods described herein. In some examples, aspects of the operations of 1910 may be performed by an SSB manager as described with reference to FIGS. 10 through 13.

At 1915, the base station may transmit, based on transmitting the system information indication, the remaining minimum system information dedicated for the first type of UE. The operations of 1915 may be performed according to the methods described herein. In some examples, aspects of the operations of 1915 may be performed by a system information controller as described with reference to FIGS. 10 through 13.

Figure 20:
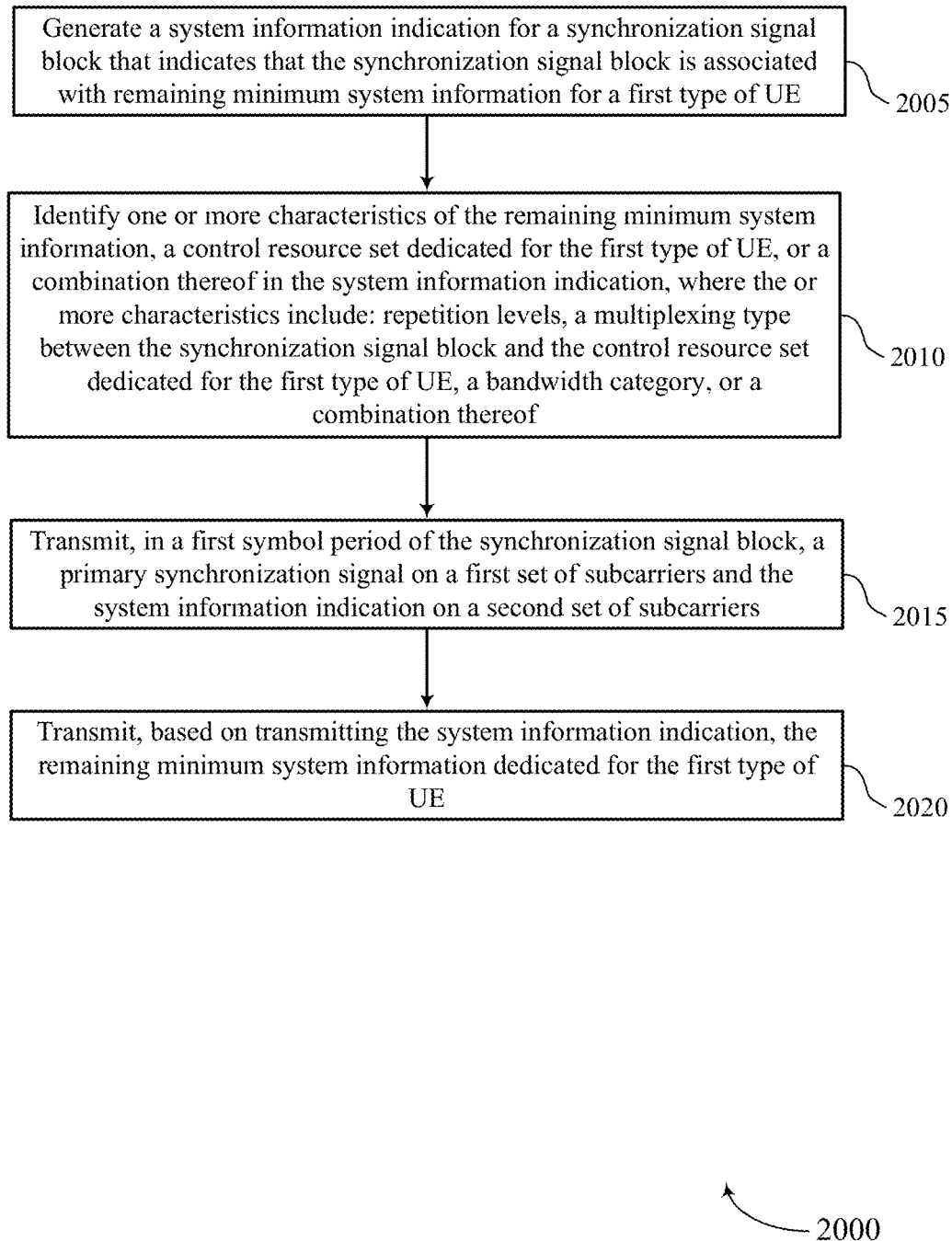

FIG. 20 shows a flowchart illustrating a method 2000 that supports early indication of new radio-light dedicated system information in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may generate a system information indication for a synchronization signal block that indicates that the synchronization signal block is associated with remaining minimum system information for a first type of UE. The operations of 2005 may be performed according to the methods described herein. In some examples, aspects of the operations of 2005 may be performed by an early indication generator as described with reference to FIGS. 10 through 13.

At 2010, the base station may transmit, in a first symbol period of the synchronization signal block, a primary synchronization signal on a first set of subcarriers and the system information indication on a second set of subcarriers. The operations of 2010 may be performed according to the methods described herein. In some examples, aspects of the operations of 2010 may be performed by an SSB manager as described with reference to FIGS. 10 through 13.

At 2015, the base station may transmit, based on transmitting the system information indication, the remaining minimum system information dedicated for the first type of UE. The operations of 2015 may be performed according to the methods described herein. In some examples, aspects of the operations of 2015 may be performed by a system information controller as described with reference to FIGS. 10 through 13.

At 2020, the base station may identify one or more characteristics of the remaining minimum system information, a control resource set dedicated for the first type of UE, or a combination thereof in the system information indication, where the or more characteristics include: repetition levels, a multiplexing type between the synchronization signal block and the control resource set dedicated for the first type of UE, a bandwidth category, or a combination thereof. The operations of 2020 may be performed according to the methods described herein. In some examples, aspects of the operations of 2020 may be performed by a characteristic identifier as described with reference to FIGS. 10 through 13.

Figure 21:
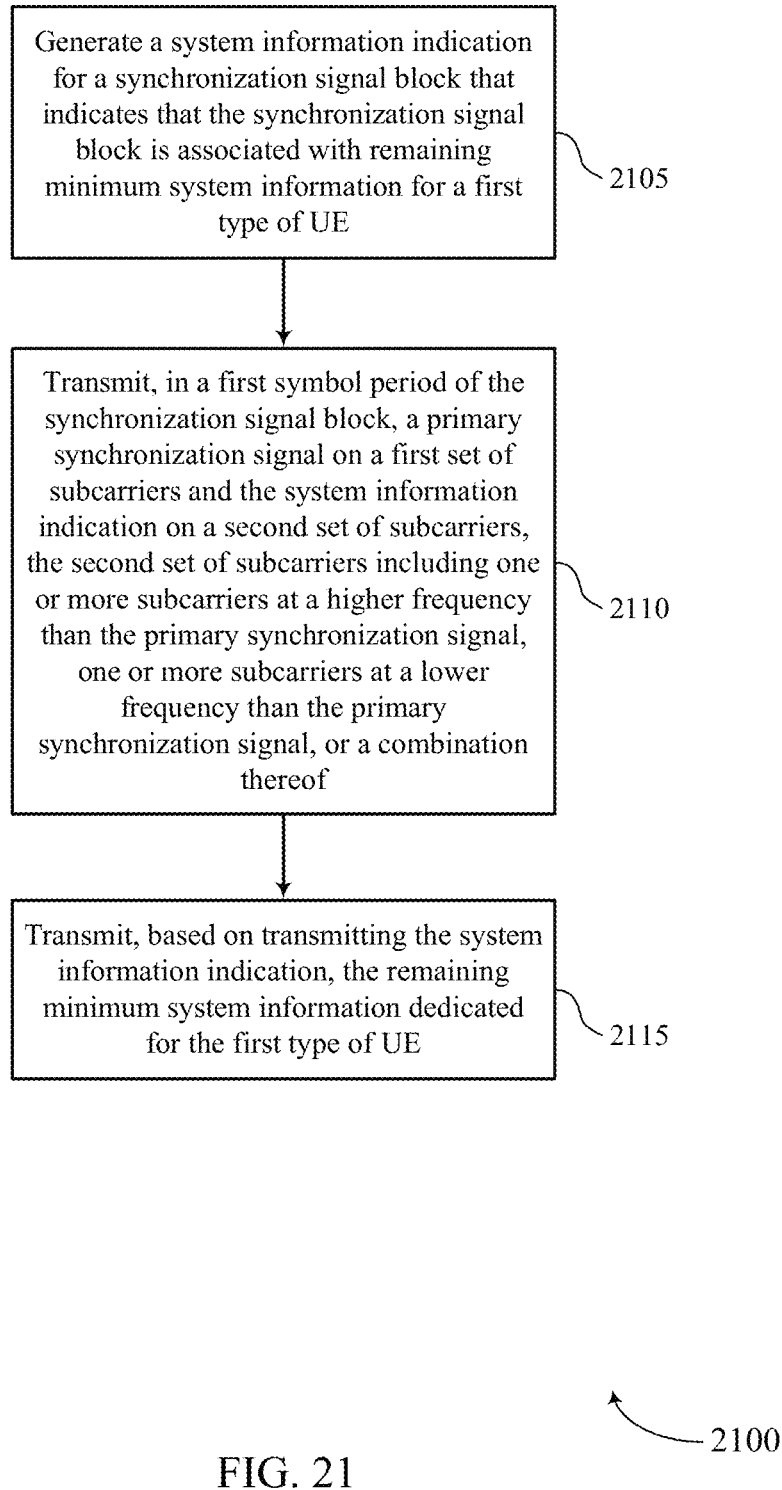

FIG. 21 shows a flowchart illustrating a method 2100 that supports early indication of new radio-light dedicated system information in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may generate a system information indication for a synchronization signal block that indicates that the synchronization signal block is associated with remaining minimum system information for a first type of UE. The operations of 2105 may be performed according to the methods described herein. In some examples, aspects of the operations of 2105 may be performed by an early indication generator as described with reference to FIGS. 10 through 13.

At 2110, the base station may transmit, in a first symbol period of the synchronization signal block, a primary synchronization signal on a first set of subcarriers and the system information indication on a second set of subcarriers. The operations of 2110 may be performed according to the methods described herein. In some examples, aspects of the operations of 2110 may be performed by an SSB manager as described with reference to FIGS. 10 through 13.

At 2115, the base station may transmit, based on transmitting the system information indication, the remaining minimum system information dedicated for the first type of UE. The operations of 2115 may be performed according to the methods described herein. In some examples, aspects of the operations of 2115 may be performed by a system information controller as described with reference to FIGS. 10 through 13.

At 2120, the base station may transmit the system information indication in one or more subcarriers at a higher frequency than the primary synchronization signal, one or more subcarriers at a lower frequency than the primary synchronization signal, or a combination thereof. The operations of 2120 may be performed according to the methods described herein. In some examples, aspects of the operations of 2120 may be performed by an SSB manager as described with reference to FIGS. 10 through 13.

Figure 22:
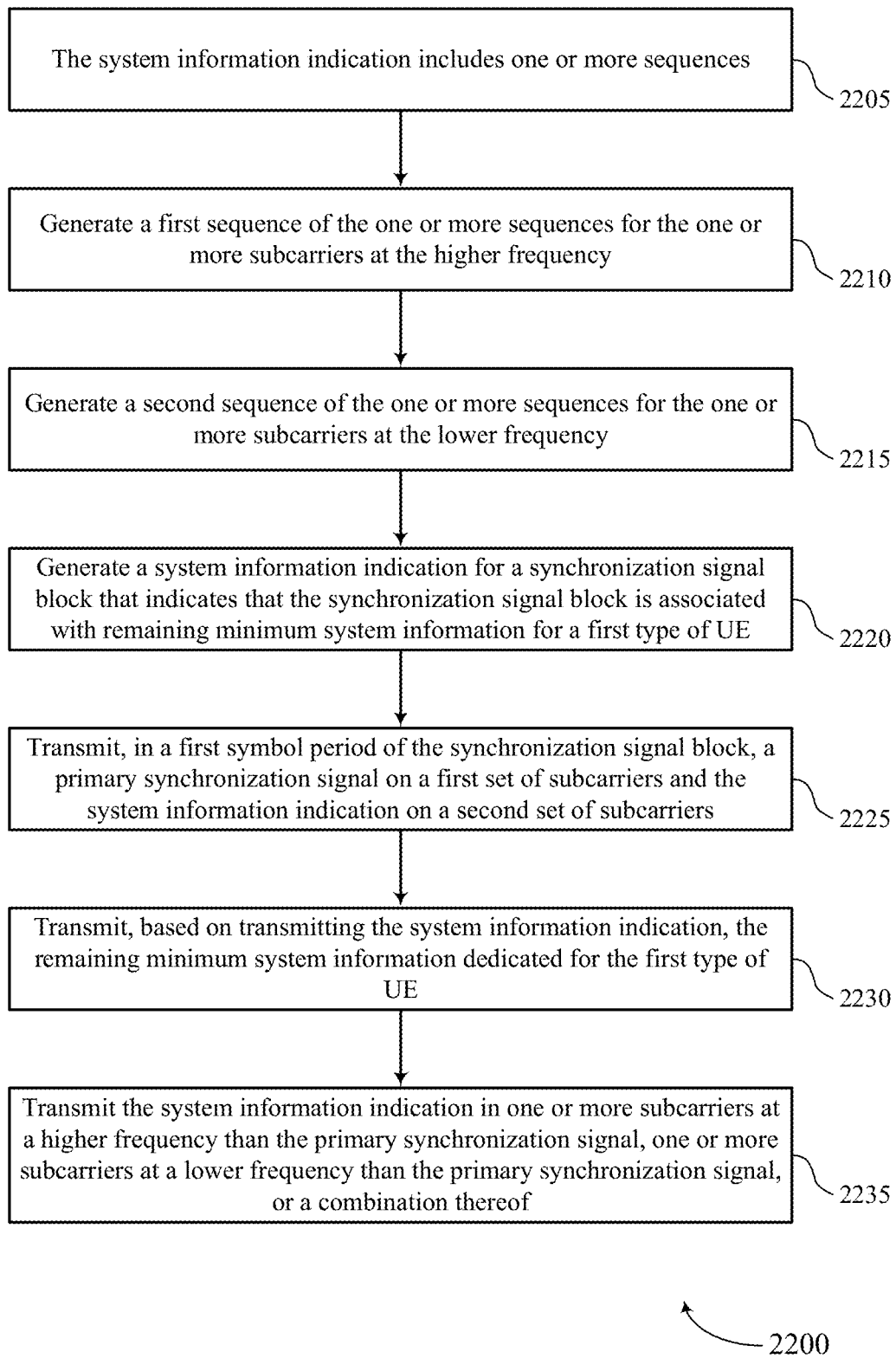

FIG. 22 shows a flowchart illustrating a method 2200 that supports early indication of new radio-light dedicated system information in accordance with aspects of the present disclosure. The operations of method 2200 may be implemented by a base station 105 or its components as described herein. For example, the operations of method 2200 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2205, the base station may the system information indication includes one or more sequences. The operations of 2205 may be performed according to the methods described herein. In some examples, aspects of the operations of 2205 may be performed by an early indication generator as described with reference to FIGS. 10 through 13.

At 2210, the base station may generate a first sequence of the one or more sequences for the one or more subcarriers at the higher frequency. The operations of 2210 may be performed according to the methods described herein. In some examples, aspects of the operations of 2210 may be performed by a sequence generator as described with reference to FIGS. 10 through 13.

At 2215, the base station may generate a second sequence of the one or more sequences for the one or more subcarriers at the lower frequency. The operations of 2215 may be performed according to the methods described herein. In some examples, aspects of the operations of 2215 may be performed by a sequence generator as described with reference to FIGS. 10 through 13.

At 2220, the base station may generate a system information indication for a synchronization signal block that indicates that the synchronization signal block is associated with remaining minimum system information for a first type of UE. The operations of 2220 may be performed according to the methods described herein. In some examples, aspects of the operations of 2220 may be performed by an early indication generator as described with reference to FIGS. 10 through 13.

At 2225, the base station may transmit, in a first symbol period of the synchronization signal block, a primary synchronization signal on a first set of subcarriers and the system information indication on a second set of subcarriers. The operations of 2225 may be performed according to the methods described herein. In some examples, aspects of the operations of 2225 may be performed by an SSB manager as described with reference to FIGS. 10 through 13.

At 2230, the base station may transmit, based on transmitting the system information indication, the remaining minimum system information dedicated for the first type of UE. The operations of 2230 may be performed according to the methods described herein. In some examples, aspects of the operations of 2230 may be performed by a system information controller as described with reference to FIGS. 10 through 13.

At 2235, the base station may transmit the system information indication in one or more subcarriers at a higher frequency than the primary synchronization signal, one or more subcarriers at a lower frequency than the primary synchronization signal, or a combination thereof. The operations of 2235 may be performed according to the methods described herein. In some examples, aspects of the operations of 2235 may be performed by an SSB manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first type of UE, comprising: receiving, in a first symbol period of a synchronization signal block, a primary synchronization signal on a first set of subcarriers and a system information indication on a second set of subcarriers; determining, in response to receiving the system information indication, that the synchronization signal block is associated with remaining minimum system information dedicated for the first type of UE; and decoding the remaining minimum system information based at least in part on a physical broadcast channel signal in a second one or more symbol periods of the synchronization signal block based at least in part on the determining that the synchronization signal block is associated with the remaining minimum system information dedicated for the first type of UE.

Aspect 2: The method of aspect 1, wherein decoding the remaining minimum system information comprises: determining that the remaining minimum system information is dedicated for the first type of UE based at least in part on the system information indication; decoding a physical broadcast channel signal of the synchronization signal block based at least in part on determining the remaining minimum system information is dedicated for the first type of UE; and decoding a control resource set dedicated for the first type of UE based at least in part on the synchronization signal block and on the determining that the remaining minimum system information is dedicated for the first type of UE, wherein the control resource set dedicated for the first type of UE schedules a downlink shared channel that carries the remaining minimum system information, and wherein decoding the remaining minimum system information is further based at least in part on decoding the physical broadcast channel signal and the control resource set dedicated for the first type of UE.

Aspect 3: The method of aspect 2, wherein the control resource set dedicated for the first type of UE comprises a type-0 control resource set (CORESET0).

Aspect 4: The method of any of aspects 1 through 3, further comprising: determining one or more characteristics of the remaining minimum system information dedicated for the first type of UE, a control resource set dedicated for the first type of UE, or a combination thereof, based at least in part on the system information indication, wherein the one or more characteristics comprise: repetition levels, a multiplexing type between the synchronization signal block and the control resource set dedicated for the first type of UE, a bandwidth category, or a combination thereof.

Aspect 5: The method of aspect 4, wherein the bandwidth category comprises a frequency range of the control resource set dedicated for the first type of UE, a frequency offset of the control resource set dedicated for the first type of UE relative to the synchronization signal block, or a combination thereof.

Aspect 6: The method of any of aspects 1 through 5, wherein decoding the remaining minimum system information comprises: determining that the remaining minimum system information is generic based at least in part on the system information indication; and terminating decoding of the synchronization signal block before the physical broadcast channel signal of the synchronization signal block is decoded based at least in part on determining the remaining minimum system information is generic.

Aspect 7: The method of any of aspects 1 through 6, further comprising: monitoring, in a first symbol period of a second synchronization signal block, for the primary synchronization signal and the system information indication; detecting that the system information indication is absent from the second synchronization signal block; and terminating, based at least in part on detecting that the system information indication is absent, decoding of the second synchronization signal block before a physical broadcast channel signal of the second synchronization signal block is decoded by the UE.

Aspect 8: The method of any of aspects 1 through 7, wherein determining that the synchronization signal block is associated with the remaining minimum system information for the first type of UE comprises: identifying that the synchronization signal block is a cell defining synchronization signal block dedicated for the first type of UE based at least in part on the system information indication indicating that the synchronization signal block is associated with the remaining minimum system information dedicated for the first type of UE.

Aspect 9: The method of aspect 8, wherein the cell defining synchronization signal block dedicated for the first type of UE comprises a same identifier as a generic cell defining synchronization signal block.

Aspect 10: The method of any of aspects 8 through 9, further comprising: performing cell selection or reselection associated with the first type of UE based at least in part on the cell defining synchronization signal block being dedicated for the first type of UE.

Aspect 11: The method of any of aspects 1 through 10, wherein receiving the system information indication on the second set of subcarriers further comprises: receiving one or more subcarriers at a higher frequency than the primary synchronization signal, one or more subcarriers at a lower frequency than the primary synchronization signal, or a combination thereof.

Aspect 12: The method of aspect 11, wherein the system information indication comprises one or more sequences.

Aspect 13: The method of aspect 12, wherein the one or more subcarriers at the higher frequency form a first sequence of the one or more sequences, and the one or more subcarriers at the lower frequency form a second sequence of the one or more sequences.

Aspect 14: The method of aspect 13, wherein the first sequence indicates a value of a first parameter associated with the remaining minimum system information, a control resource set dedicated for the first type of UE, or a combination thereof, and the second sequence indicates a value of a second parameter associated with the remaining minimum system information, the control resource set dedicated for the first type of UE, or a combination thereof.

Aspect 15: The method of aspect 14, wherein the value of the first parameter or the value of the second parameter indicates a direction of a cell defining synchronization signal block dedicated for the first type of UE relative to the primary synchronization signal.

Aspect 16: The method of any of aspects 14 through 15, wherein the value of the first parameter or the value of the second parameter indicates a frequency offset of a cell defining synchronization signal block dedicated for the first type of UE relative to the primary synchronization signal.

Aspect 17: The method of claim 16, wherein the first sequence and the second sequence indicate a same value for a parameter associated with the remaining minimum system information, a control resource set dedicated for the first type of UE, or a combination thereof.

Aspect 18: The method of any of aspects 12 through 17, wherein the first sequence, the second sequence, or both, indicate a value of a parameter associated with the remaining minimum system information, a control resource set dedicated for the first type of UE, or a combination thereof, the value of the parameter indicates a direction, or a frequency offset, or both, of a cell defining synchronization signal block dedicated for the first type of UE relative to the primary synchronization signal.

Aspect 19: The method of any of aspects 12 through 18, wherein the one or more subcarriers at the higher frequency and the one or more subcarriers at the lower frequency form a joint sequence.

Aspect 20: The method of any of aspects 12 through 19, further comprising: comparing the one or more sequences to a set of stored sequences to determine that the system information indication is for the UE.

Aspect 21: The method of any of aspects 12 through 20, wherein the one or more sequences comprise a multi-stage structure.

Aspect 22: The method of any of aspects 11 through 21, wherein the system information indication comprises a first sequence and a second sequence, the one or more subcarriers at the higher frequency form the first sequence, and the one or more subcarriers at the lower frequency form the second sequence.

Aspect 23: The method of any of aspects 11 through 22, wherein the one or more subcarriers at the higher frequency and the one or more subcarriers at the lower frequency form a joint sequence, the system information indication comprising the joint sequence.

Aspect 24: The method of any of aspects 11 through 23, wherein the system information indication comprises one or more sequences having a multi-stage structure.

Aspect 25: The method of any of aspects 1 through 24, wherein the first type of UE is associated with reduced capability (RedCap) UEs, or wherein the first type of UE is associated with a number of receive antennas that is below a receive antenna threshold, or wherein the first type of UE is associated with a number of receive antennas comprising receive antenna power loss that is above an antenna gain loss threshold, or wherein the first type of UE is associated with a number of transmit antennas comprising transmit antenna power loss that is above an antenna gain loss threshold, or wherein the first type of UE is associated with a time ON duration that is below a time ON threshold, or wherein the first type of UE is associated with a processing timeline capability that is below a processing timeline capability threshold, or wherein the first type of UE is associated with a maximum transmission power that is below a maximum transmission power threshold, or wherein the first type of UE is associated with a maximum bandwidth that is below a maximum bandwidth threshold, or any combination thereof.

Aspect 26: The method of any of aspects 1 through 25, wherein the first type of UE is a type of low tier UE.

Aspect 27: The method of any of aspects 1 through 26, wherein the first type of UE is a generic UE.

Aspect 28: A method for wireless communications at a base station, comprising: generating a system information indication for a synchronization signal block that indicates that the synchronization signal block is associated with remaining minimum system information for a first type of UE; transmitting, in a first symbol period of the synchronization signal block, a primary synchronization signal on a first set of subcarriers and the system information indication on a second set of subcarriers; and transmitting, based at least in part on transmitting the system information indication, the remaining minimum system information dedicated for the first type of UE.

Aspect 29: The method of aspect 28, further comprising: transmitting, based on transmitting the primary synchronization signal, a physical broadcast channel signal in a second one or more symbol periods of the synchronization signal block; and transmitting, based at least in part on transmitting the physical broadcast channel signal, a control resource set dedicated for the first type of UE, wherein the control resource set dedicated for the first type of UE schedules a downlink shared channel that carries the remaining minimum system information, and wherein transmitting the system information indication indicates that the remaining minimum system information is dedicated for the first type of UE.

Aspect 30: The method of any of aspects 28 through 29, wherein the control resource set dedicated for the first type of UE comprises a type-0 control resource set (CORESET0).

Aspect 31: The method of any of aspects 28 through 30, further comprising: identifying one or more characteristics of the remaining minimum system information, a control resource set dedicated for the first type of UE, or a combination thereof in the system information indication, wherein the or more characteristics comprise: repetition levels, a multiplexing type between the synchronization signal block and the control resource set dedicated for the first type of UE, a bandwidth category, or a combination thereof.

Aspect 32: The method of aspect 31, wherein the bandwidth category comprises a frequency range of the control resource set dedicated for the first type of UE, frequency offset of the control resource set dedicated for the first type of UE relative to the synchronization signal block, or a combination thereof.

Aspect 33: The method of any of aspects 28 through 32, wherein transmitting the system information indication indicates that the remaining minimum system information is generic.

Aspect 34: The method of any of aspects 28 through 33, wherein the synchronization signal block is a cell defining synchronization signal block dedicated for the first type of UE based at least in part on the system information indication indicating that the synchronization signal block is associated with the remaining minimum system information dedicated for the first type of UE.

Aspect 35: The method of aspect 34, wherein the cell defining synchronization signal block dedicated for the first type of UE comprises a same identifier as a generic cell defining synchronization signal block.

Aspect 36: The method of any of aspects 28 through 35, wherein transmitting the system information indication in the first symbol period on the second set of subcarriers further comprises: transmitting the system information indication in one or more subcarriers at a higher frequency than the primary synchronization signal, one or more subcarriers at a lower frequency than the primary synchronization signal, or a combination thereof.

Aspect 37: The method of aspect 36, wherein the system information indication comprises one or more sequences.

Aspect 38: The method of aspect 37, further comprising: generating a first sequence of the one or more sequences for the one or more subcarriers at the higher frequency; and generating a second sequence of the one or more sequences for the one or more subcarriers at the lower frequency.

Aspect 39: The method of aspect 38, wherein the first sequence indicates a value of a first parameter associated with the remaining minimum system information, a control resource set dedicated for the first type of UE, or a combination thereof, and the second sequence indicates a value of a second parameter associated with the remaining minimum system information, the control resource set dedicated for the first type of UE, or a combination thereof.

Aspect 40: The method of aspect 39, wherein the value of the first parameter or the value of the second parameter indicates a direction of a cell defining synchronization signal block dedicated for the first type of UE relative to the primary synchronization signal.

Aspect 41: The method of any of aspects 39 through 40, wherein the value of the first parameter or the value of the second parameter indicates a frequency offset of a cell defining synchronization signal block dedicated for the first type of UE relative to the primary synchronization signal.

Aspect 42: The method of any of aspects 38 through 41, wherein the first sequence and the second sequence indicate a same value for a parameter associated with the remaining minimum system information, a control resource set dedicated for the first type of UE, or a combination thereof.

Aspect 43: The method of any of aspects 37 through 42, wherein the one or more subcarriers at the higher frequency and the one or more subcarriers at the lower frequency form a joint sequence.

Aspect 44: The method of any of aspects 37 through 43, wherein the one or more sequences comprise a multi-stage structure.

Aspect 45: The method of any of aspects 28 through 44, wherein the first type of UE is a type of low tier UE.

Aspect 46: The method of any of aspects 28 through 45, wherein the first type of UE is a generic UE.

Aspect 47: An apparatus for wireless communications at a first type of UE, comprising a processor; memory coupled with the processor; and instructions stored in the memory and executable by the processor to cause the apparatus to perform a method of any of aspects 1 through 27.

Aspect 48: An apparatus for wireless communications at a first type of UE, comprising at least one means for performing a method of any of aspects 1 through 27.

Aspect 49: A non-transitory computer-readable medium storing code for wireless communications at a first type of UE, the code comprising instructions executable by a processor to perform a method of any of aspects 1 through 27.

Aspect 50: An apparatus for wireless communications at a base station, comprising a processor; memory coupled with the processor; and instructions stored in the memory and executable by the processor to cause the apparatus to perform a method of any of aspects 28 through 46.

Aspect 51: An apparatus for wireless communications at a base station, comprising at least one means for performing a method of any of aspects 28 through 46.

Aspect 52: A non-transitory computer-readable medium storing code for wireless communications at a base station, the code comprising instructions executable by a processor to perform a method of any of aspects 28 through 46.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first type of user equipment (UE), comprising:
   receiving, in a first symbol period of a synchronization signal block, a primary synchronization signal on a first set of subcarriers and a system information indication on a second set of subcarriers;
   determining, in response to receiving the system information indication, that the synchronization signal block is associated with remaining minimum system information dedicated for the first type of UE; and
   decoding the remaining minimum system information based at least in part on a physical broadcast channel signal in a second one or more symbol periods of the synchronization signal block based at least in part on the determining that the synchronization signal block is associated with the remaining minimum system information dedicated for the first type of UE.

2. The method of claim 1, wherein decoding the remaining minimum system information comprises:
   determining that the remaining minimum system information is dedicated for the first type of UE based at least in part on the system information indication;
   decoding a physical broadcast channel signal of the synchronization signal block based at least in part on determining the remaining minimum system information is dedicated for the first type of UE; and
   decoding a control resource set dedicated for the first type of UE based at least in part on the synchronization signal block and on the determining that the remaining minimum system information is dedicated for the first type of UE, wherein the control resource set dedicated for the first type of UE schedules a downlink shared channel that carries the remaining minimum system information, and wherein decoding the remaining minimum system information is further based at least in part on decoding the physical broadcast channel signal and the control resource set dedicated for the first type of UE.

3. The method of claim 2, wherein the control resource set dedicated for the first type of UE comprises a type-0 control resource set (CORESET0).

4. The method of claim 1, further comprising:
   determining one or more characteristics of the remaining minimum system information dedicated for the first type of UE, a control resource set dedicated for the first type of UE, or a combination thereof, based at least in part on the system information indication, wherein the one or more characteristics comprise: repetition levels, a multiplexing type between the synchronization signal block and the control resource set dedicated for the first type of UE, a bandwidth category, or a combination thereof.

5. The method of claim 4, wherein the bandwidth category comprises a frequency range of the control resource set dedicated for the first type of UE, a frequency offset of the control resource set dedicated for the first type of UE relative to the synchronization signal block, or a combination thereof.

6. The method of claim 1, wherein decoding the remaining minimum system information comprises:
   determining that the remaining minimum system information is generic based at least in part on the system information indication; and terminating decoding of the synchronization signal block before the physical broadcast channel signal of the synchronization signal block is decoded based at least in part on determining the remaining minimum system information is generic.

7. The method of claim 1, further comprising:
monitoring, in a first symbol period of a second synchronization signal block, for the primary synchronization signal and the system information indication;
detecting that the system information indication is absent from the second synchronization signal block; and
terminating, based at least in part on detecting that the system information indication is absent, decoding of the second synchronization signal block before a physical broadcast channel signal of the second synchronization signal block is decoded by the UE.

8. The method of claim 1, wherein determining that the synchronization signal block is associated with the remaining minimum system information for the first type of UE comprises:
identifying that the synchronization signal block is a cell defining synchronization signal block dedicated for the first type of UE based at least in part on the system information indication indicating that the synchronization signal block is associated with the remaining minimum system information dedicated for the first type of UE.

9. The method of claim 8, wherein the cell defining synchronization signal block dedicated for the first type of UE comprises a same identifier as a generic cell defining synchronization signal block.

10. The method of claim 8, further comprising:
performing cell selection or reselection associated with the first type of UE based at least in part on the cell defining synchronization signal block being dedicated for the first type of UE.

11. The method of claim 1, wherein receiving the system information indication on the second set of subcarriers further comprises:
receiving one or more subcarriers at a higher frequency than the primary synchronization signal, one or more subcarriers at a lower frequency than the primary synchronization signal, or a combination thereof.

12. The method of claim 11, wherein the system information indication comprises a first sequence and a second sequence, wherein the one or more subcarriers at the higher frequency form the first sequence, and the one or more subcarriers at the lower frequency form the second sequence.

13. The method of claim 12, wherein the first sequence, the second sequence, or both, indicate a value of a parameter associated with the remaining minimum system information, a control resource set dedicated for the first type of UE, or a combination thereof, wherein the value of the parameter indicates a direction, or a frequency offset, or both, of a cell defining synchronization signal block dedicated for the first type of UE relative to the primary synchronization signal.

14. The method of claim 11, wherein the one or more subcarriers at the higher frequency and the one or more subcarriers at the lower frequency form a joint sequence, the system information indication comprising the joint sequence.

15. The method of claim 11, wherein the system information indication comprises one or more sequences having a multi-stage structure.

16. The method of claim 1,
wherein the first type of UE is associated with reduced capability (RedCap) UEs, or
wherein the first type of UE is associated with a number of receive antennas that is below a receive antenna threshold, or
wherein the first type of UE is associated with a number of receive antennas comprising receive antenna power loss that is above an antenna gain loss threshold, or
wherein the first type of UE is associated with a number of transmit antennas comprising transmit antenna power loss that is above an antenna gain loss threshold, or
wherein the first type of UE is associated with a time ON duration that is below a time ON threshold, or
wherein the first type of UE is associated with a processing timeline capability that is below a processing timeline capability threshold, or
wherein the first type of UE is associated with a maximum transmission power that is below a maximum transmission power threshold, or
wherein the first type of UE is associated with a maximum bandwidth that is below a maximum bandwidth threshold, or
any combination thereof.

17. A method for wireless communications at a base station, comprising:
generating a system information indication for a synchronization signal block that indicates that the synchronization signal block is associated with remaining minimum system information for a first type of user equipment (UE);
transmitting, in a first symbol period of the synchronization signal block, a primary synchronization signal on a first set of subcarriers and the system information indication on a second set of subcarriers; and
transmitting, based at least in part on transmitting the system information indication, the remaining minimum system information dedicated for the first type of UE.

18. The method of claim 17, further comprising:
transmitting, based on transmitting the primary synchronization signal, a physical broadcast channel signal in a second one or more symbol periods of the synchronization signal block; and
transmitting, based at least in part on transmitting the physical broadcast channel signal, a control resource set dedicated for the first type of UE, wherein the control resource set dedicated for the first type of UE schedules a downlink shared channel that carries the remaining minimum system information, and wherein transmitting the system information indication indicates that the remaining minimum system information is dedicated for the first type of UE.

19. The method of claim 17, further comprising:
identifying one or more characteristics of the remaining minimum system information, a control resource set dedicated for the first type of UE, or a combination thereof in the system information indication, wherein the or more characteristics comprise: repetition levels, a multiplexing type between the synchronization signal block and the control resource set dedicated for the first type of UE, a bandwidth category, or a combination thereof.

20. The method of claim 17, wherein transmitting the system information indication indicates that the remaining minimum system information is generic.

21. The method of claim 17, wherein the synchronization signal block is a cell defining synchronization signal block dedicated for the first type of UE based at least in part on the system information indication indicating that the synchronization signal block is associated with the remaining minimum system information dedicated for the first type of UE.

22. The method of claim 17, wherein transmitting the system information indication in the first symbol period on the second set of subcarriers further comprises:
transmitting the system information indication in one or more subcarriers at a higher frequency than the primary synchronization signal, one or more subcarriers at a lower frequency than the primary synchronization signal, or a combination thereof.

23. An apparatus for wireless communications at a first type of user equipment (UE), comprising:
a processor,
memory coupled with the processor; and
instructions stored in the memory and executable by the processor to cause the apparatus to:
receive, in a first symbol period of a synchronization signal block, a primary synchronization signal on a first set of subcarriers and a system information indication on a second set of subcarriers;
determine, in response to receiving the system information indication, that the synchronization signal block is associated with remaining minimum system information dedicated for the first type of UE; and
decode the remaining minimum system information based at least in part on a physical broadcast channel signal in a second one or more symbol periods of the synchronization signal block based at least in part on the determining that the synchronization signal block is associated with the remaining minimum system information dedicated for the first type of UE.

24. The apparatus of claim 23, wherein the instructions to decode the remaining minimum system information are executable by the processor to cause the apparatus to:
determine that the remaining minimum system information is dedicated for the first type of UE based at least in part on the system information indication;
decode a physical broadcast channel signal of the synchronization signal block based at least in part on determining the remaining minimum system information is dedicated for the first type of UE; and
decode a control resource set dedicated for the first type of UE based at least in part on the synchronization signal block and on the determining that the remaining minimum system information is dedicated for the first type of UE, wherein the control resource set dedicated for the first type of UE schedules a downlink shared channel that carries the remaining minimum system information, and wherein decoding the remaining minimum system information is further based at least in part on decoding the physical broadcast channel signal and the control resource set dedicated for the first type of UE.

25. The apparatus of claim 23, wherein the instructions are further executable by the processor to cause the apparatus to:
determine one or more characteristics of the remaining minimum system information dedicated for the first type of UE, a control resource set dedicated for the first type of UE, or a combination thereof, based at least in part on the system information indication, wherein the one or more characteristics comprise: repetition levels, a multiplexing type between the synchronization signal block and the control resource set dedicated for the first type of UE, a bandwidth category, or a combination thereof.

26. The apparatus of claim 23, wherein the instructions to decode the remaining minimum system information are executable by the processor to cause the apparatus to:
determine that the remaining minimum system information is generic based at least in part on the system information indication; and
terminate decoding of the synchronization signal block before the physical broadcast channel signal of the synchronization signal block is decoded based at least in part on determining the remaining minimum system information is generic.

27. The apparatus of claim 23, wherein the instructions are further executable by the processor to cause the apparatus to:
monitor, in a first symbol period of a second synchronization signal block, for the primary synchronization signal and the system information indication;
detect that the system information indication is absent from the second synchronization signal block; and
terminate, based at least in part on detecting that the system information indication is absent, decoding of the second synchronization signal block before a physical broadcast channel signal of the second synchronization signal block is decoded by the UE.

28. The apparatus of claim 23, wherein the instructions to determine that the synchronization signal block is associated with the remaining minimum system information for the first type of UE are executable by the processor to cause the apparatus to:
identify that the synchronization signal block is a cell defining synchronization signal block dedicated for the first type of UE based at least in part on the system information indication indicating that the synchronization signal block is associated with the remaining minimum system information dedicated for the first type of UE.

29. The apparatus of claim 23,
wherein the first type of UE is associated with reduced capability (RedCap) UEs, or
wherein the first type of UE is associated with a number of receive antennas that is below a receive antenna threshold, or
wherein the first type of UE is associated with a number of receive antennas comprising receive antenna power loss that is above an antenna gain loss threshold, or
wherein the first type of UE is associated with a number of transmit antennas comprising transmit antenna power loss that is above an antenna gain loss threshold, or
wherein the first type of UE is associated with a time ON duration that is below a time ON threshold, or
wherein the first type of UE is associated with a processing timeline capability that is below a processing timeline capability threshold, or
wherein the first type of UE is associated with a maximum transmission power that is below a maximum transmission power threshold, or
wherein the first type of UE is associated with a maximum bandwidth that is below a maximum bandwidth threshold, or
any combination thereof.

30. An apparatus for wireless communications at a base station, comprising:
a processor,
memory coupled with the processor; and
instructions stored in the memory and executable by the processor to cause the apparatus to:
generate a system information indication for a synchronization signal block that indicates that the synchronization signal block is associated with remaining minimum system information for a first type of user equipment (UE);
transmit, in a first symbol period of the synchronization signal block, a primary synchronization signal on a first set of subcarriers and the system information indication on a second set of subcarriers; and
transmit, based at least in part on transmitting the system information indication, the remaining minimum system information dedicated for the first type of UE.

* * * * *